(12) United States Patent
Tanaka

(10) Patent No.: US 11,187,880 B2
(45) Date of Patent: *Nov. 30, 2021

(54) ZOOM LENS, IMAGE PICKUP OPTICAL DEVICE, AND DIGITAL APPARATUS

(71) Applicant: Konica Minolta Inc., Tokyo (JP)

(72) Inventor: Hiroaki Tanaka, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/866,843

(22) Filed: May 5, 2020

(65) Prior Publication Data

US 2020/0371325 A1 Nov. 26, 2020

(30) Foreign Application Priority Data

May 23, 2019 (JP) .............................. JP2019-096880

(51) Int. Cl.
| | |
|---|---|
| *G02B 15/14* | (2006.01) |
| *G02B 15/163* | (2006.01) |
| *H04N 5/225* | (2006.01) |
| *H04N 5/232* | (2006.01) |
| *G02B 13/18* | (2006.01) |

(52) U.S. Cl.
CPC ......... *G02B 15/1461* (2019.08); *G02B 13/18* (2013.01); *G02B 15/163* (2013.01); *H04N 5/2254* (2013.01); *H04N 5/23245* (2013.01)

(58) Field of Classification Search
CPC ............. H04N 5/2254; H04N 5/23245; G02B 15/1461; G02B 15/163; G02B 13/18; G02B 15/20
See application file for complete search history.

(56) References Cited

U.S. PATENT DOCUMENTS

2020/0371324 A1* 11/2020 Tanaka ................... G02B 15/20

FOREIGN PATENT DOCUMENTS

| JP | 2014-106243 A | 6/2014 |
|---|---|---|
| JP | 2016-109720 A | 6/2016 |

* cited by examiner

*Primary Examiner* — Abdelaaziz Tissire
*Assistant Examiner* — John H Morehead, III
(74) *Attorney, Agent, or Firm* — Rankin, Hill & Clark LLP

(57) ABSTRACT

A zoom lens includes, in order from an object side: a first lens group having positive refractive power; a second lens group having negative refractive power; a third lens group; a fourth lens group having positive refractive power; a fifth lens group having negative refractive power; and a sixth lens group having positive refractive power, wherein, during zooming, an interval between adjacent two lens groups varies among the first lens group, the second lens group, the third lens group, the fourth lens group, the fifth lens group, and the sixth lens group, the sixth lens group includes at least one negative lens, and the following Conditional Expression (1) is satisfied:

$$0 < ft/fl \leq 0.42 \qquad (1)$$

where ft represents a focal length of an entire system at a tele end, and fl represents a focal length of the first lens group.

8 Claims, 33 Drawing Sheets

EX1

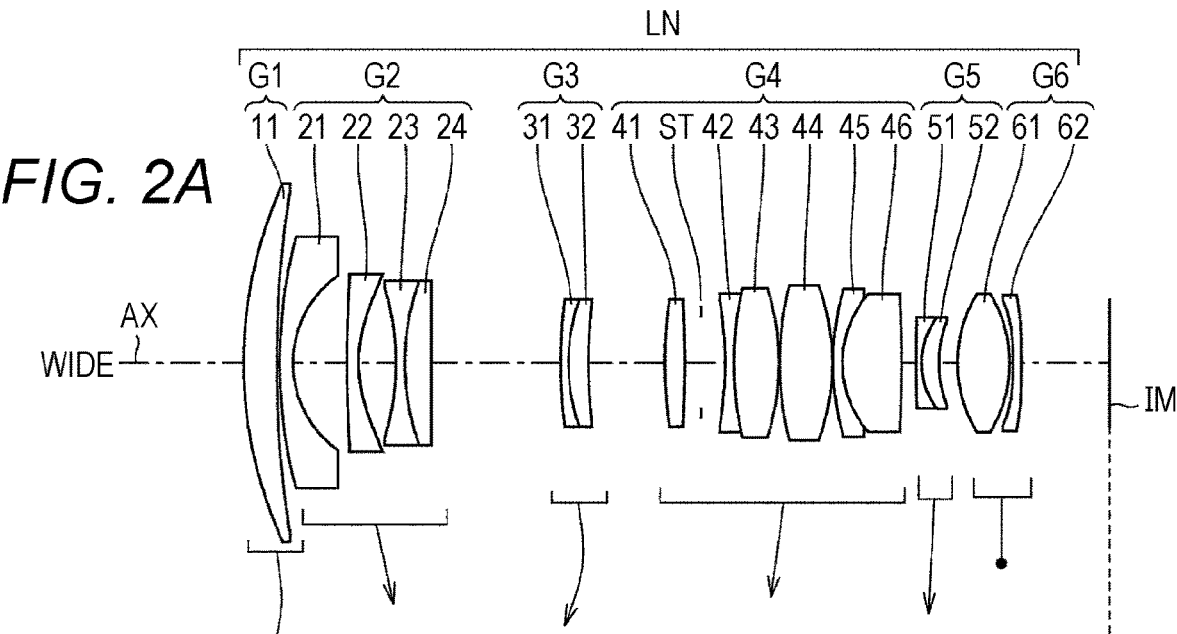
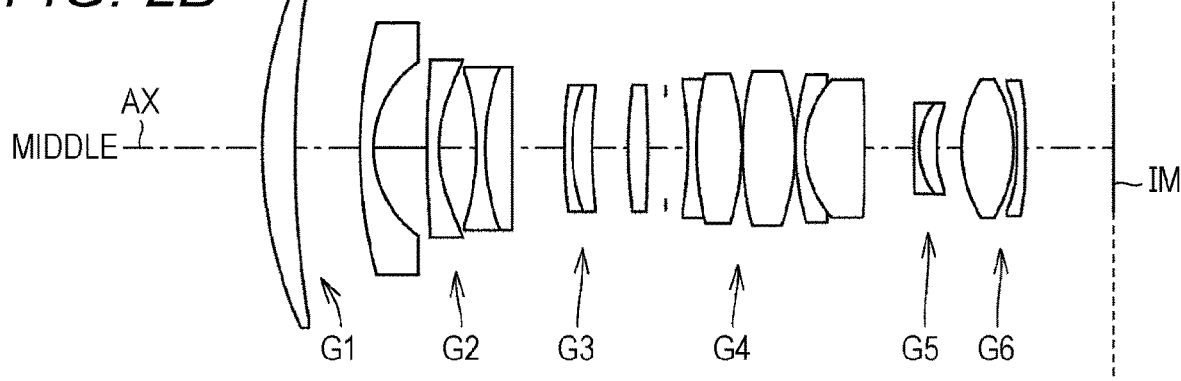
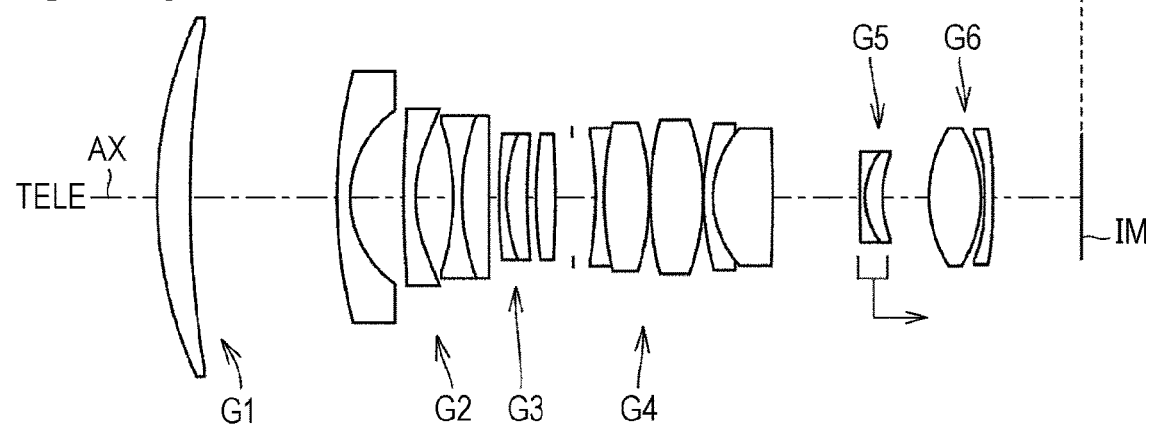

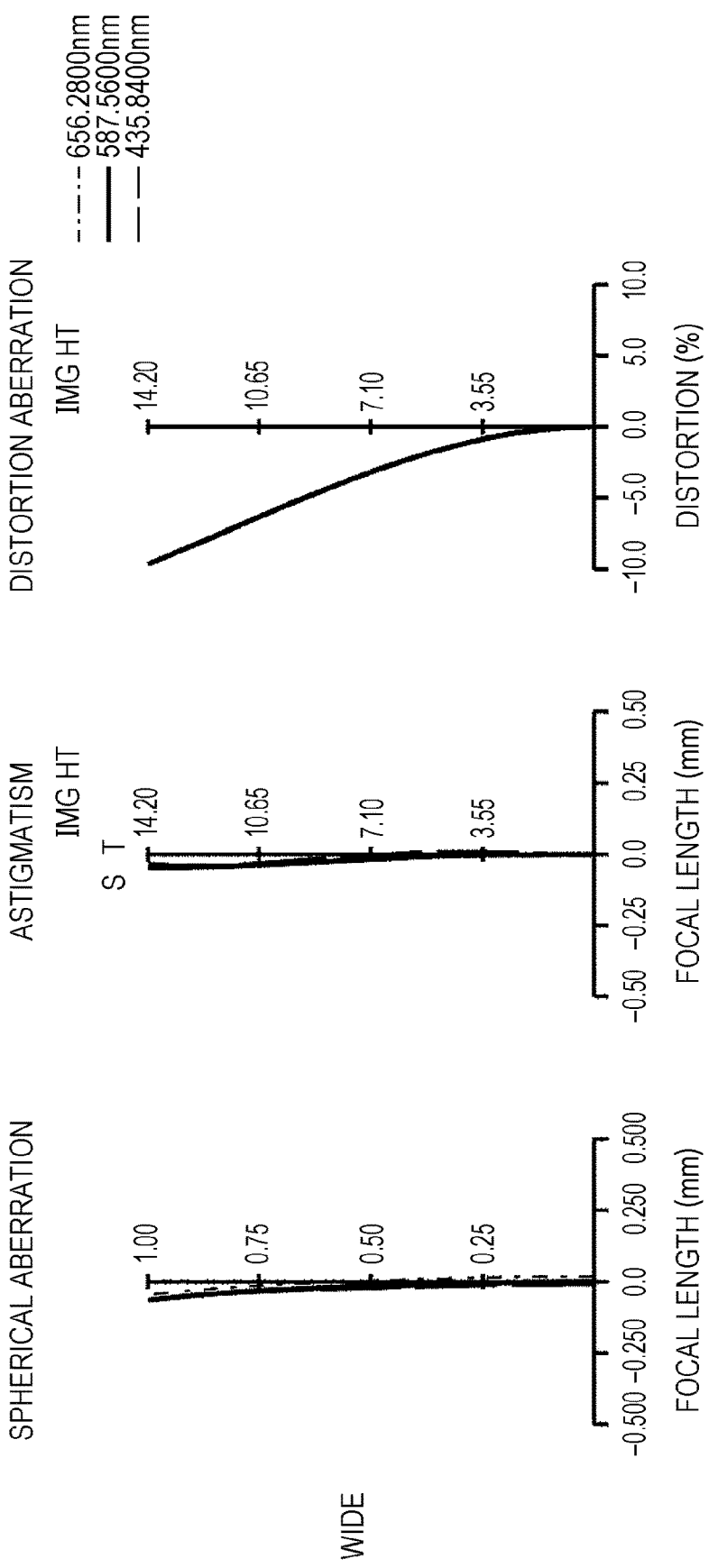

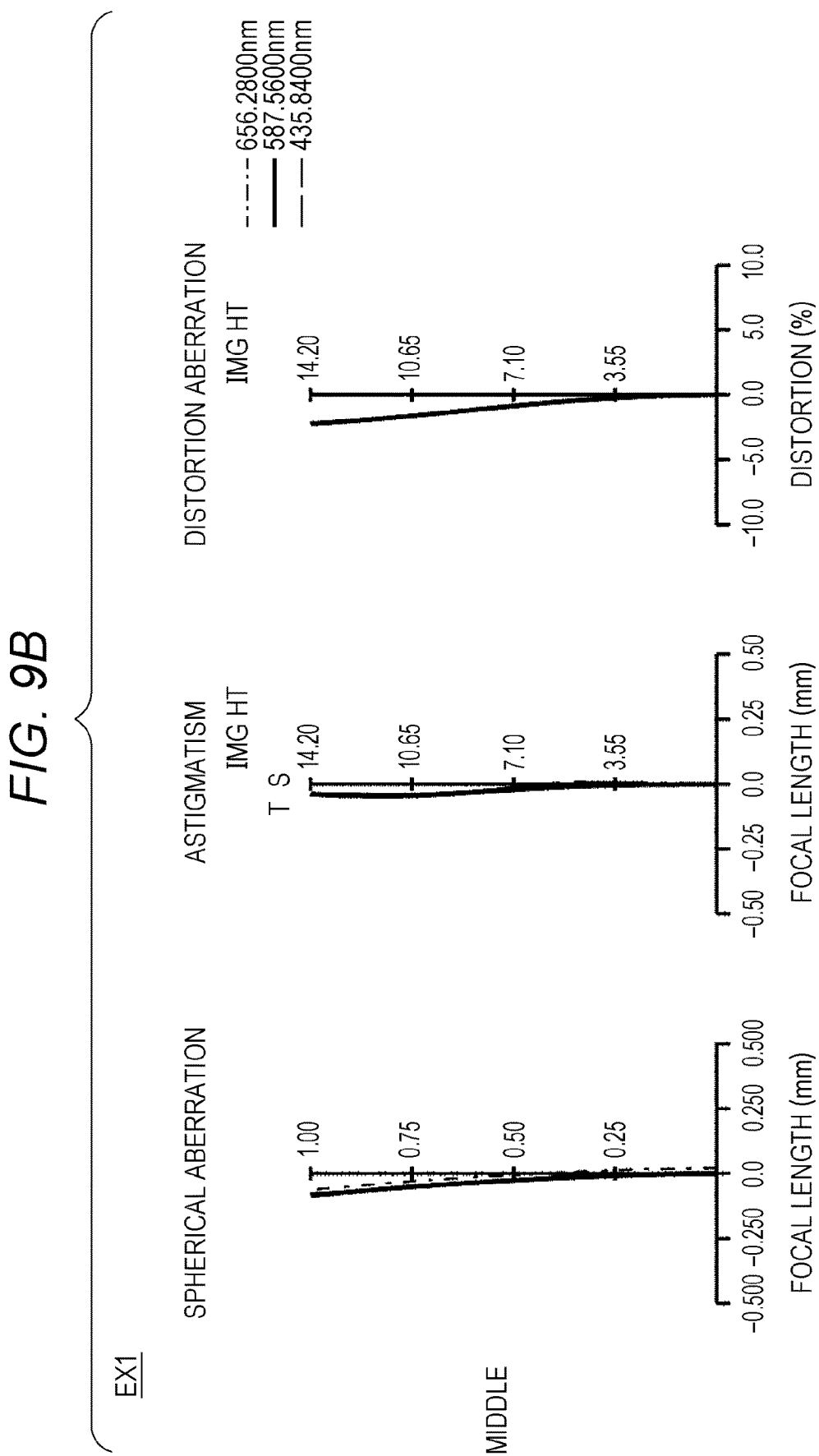

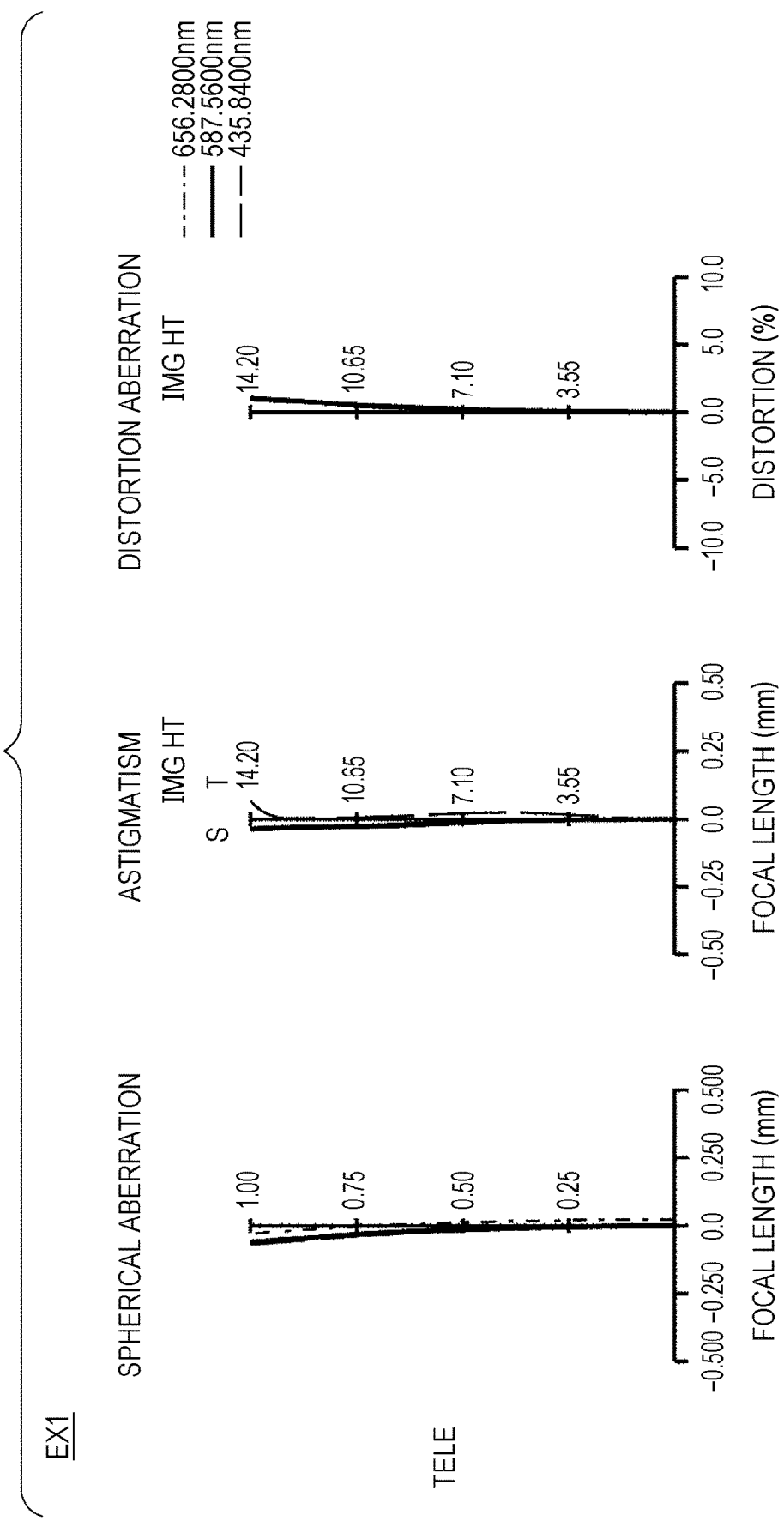

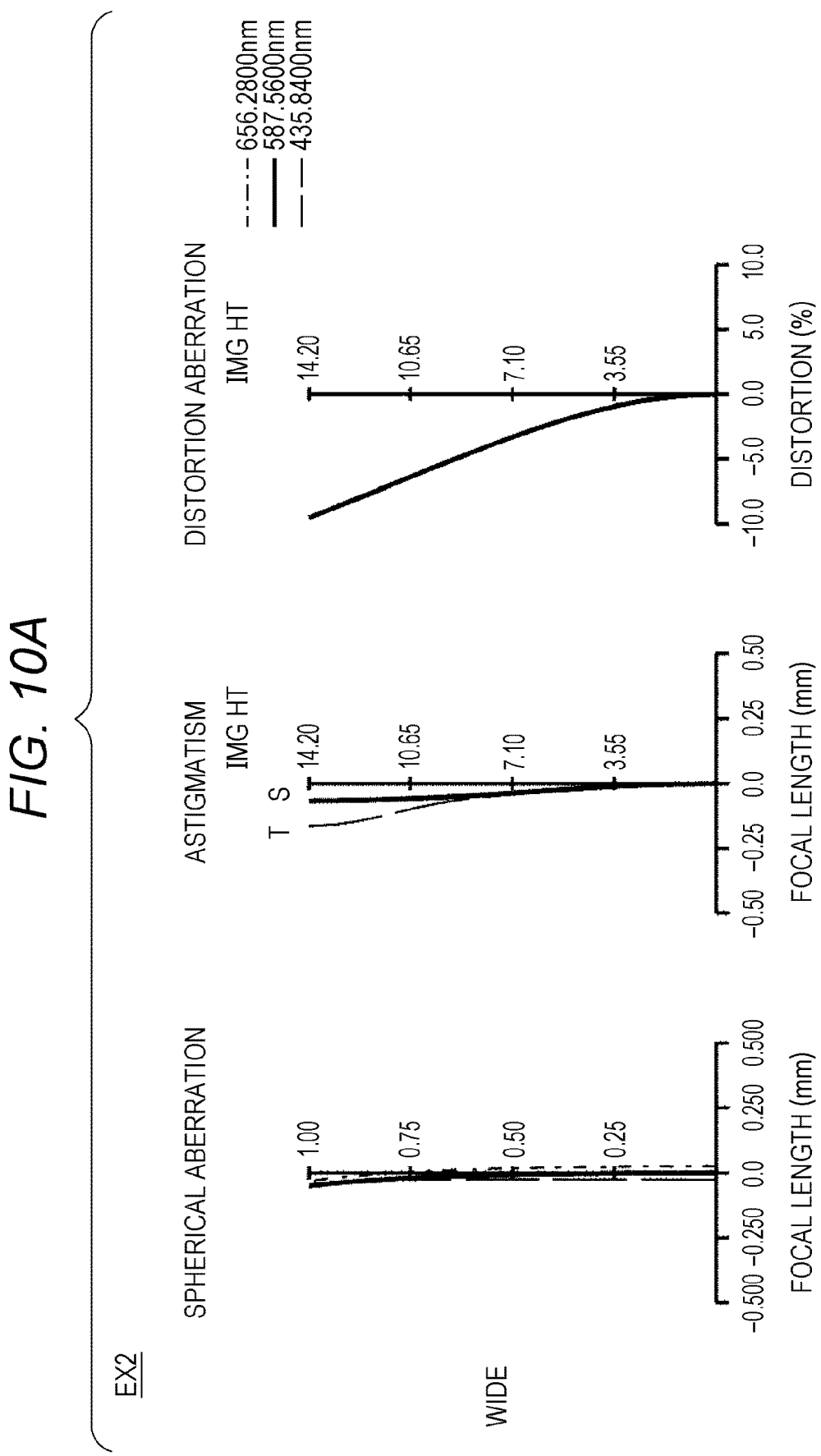

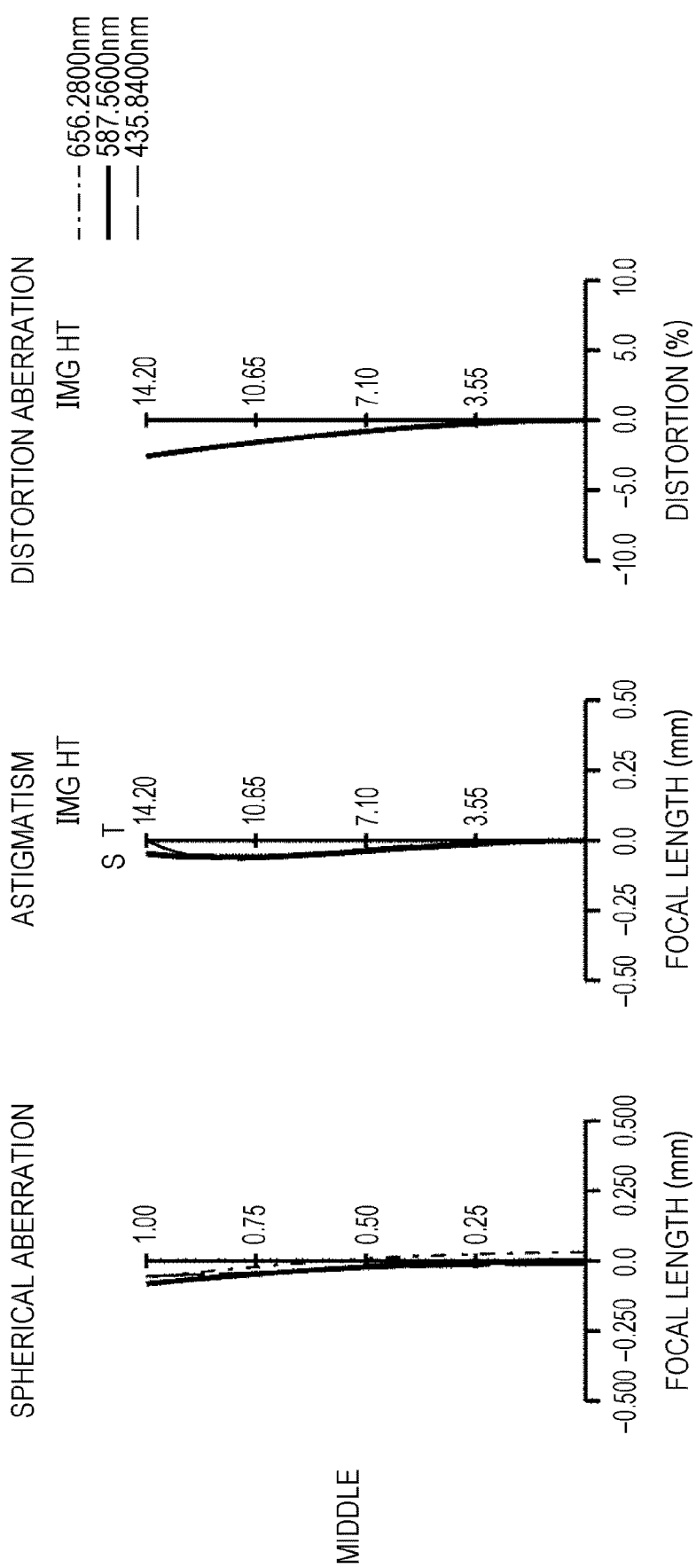

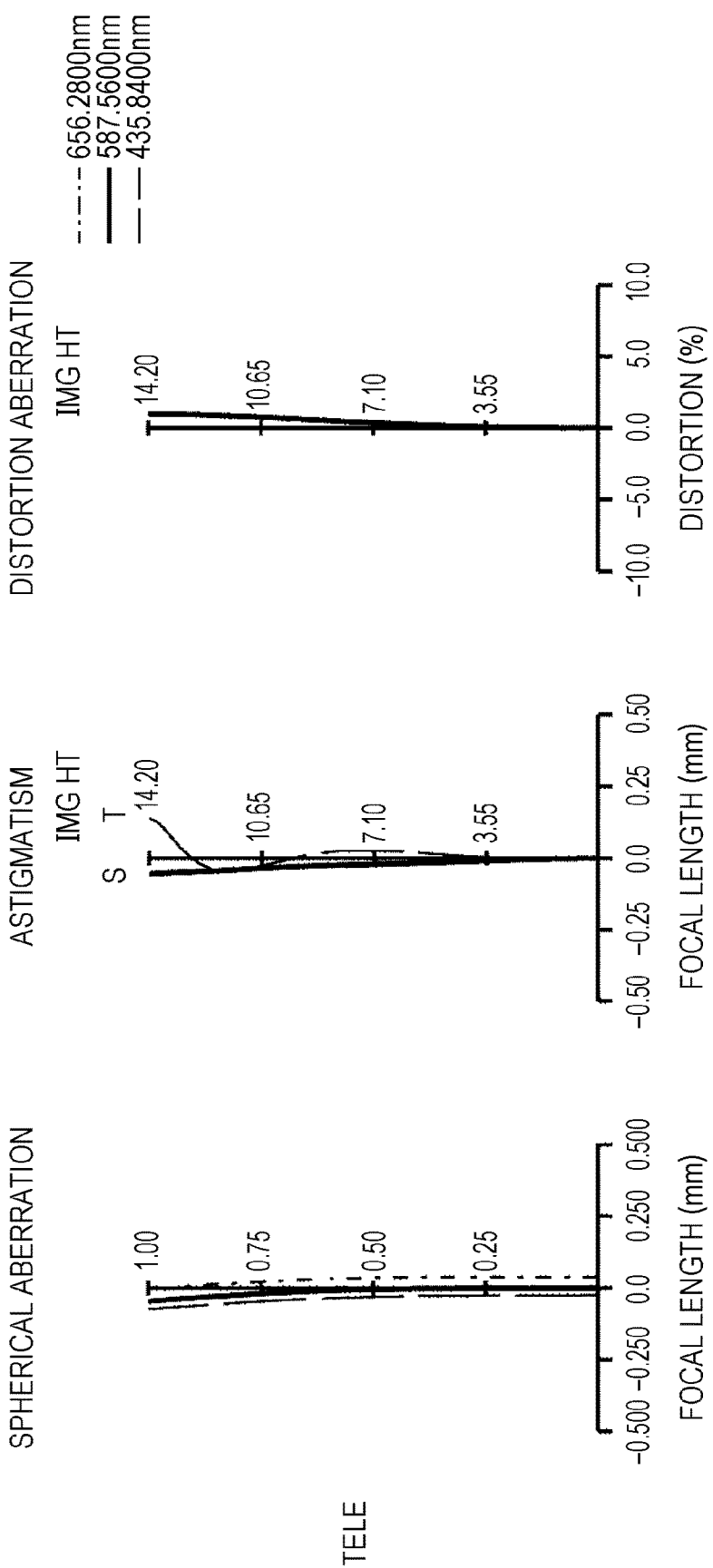

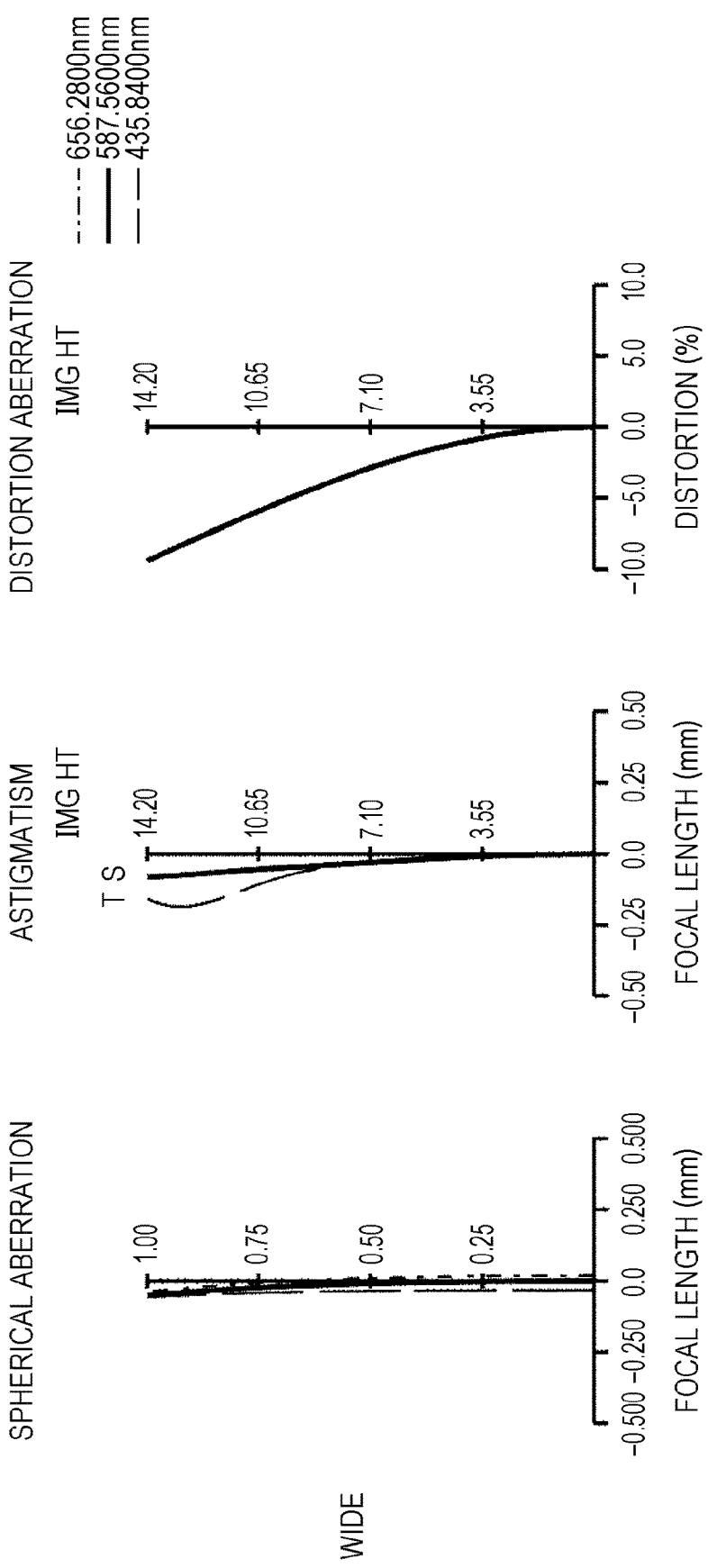

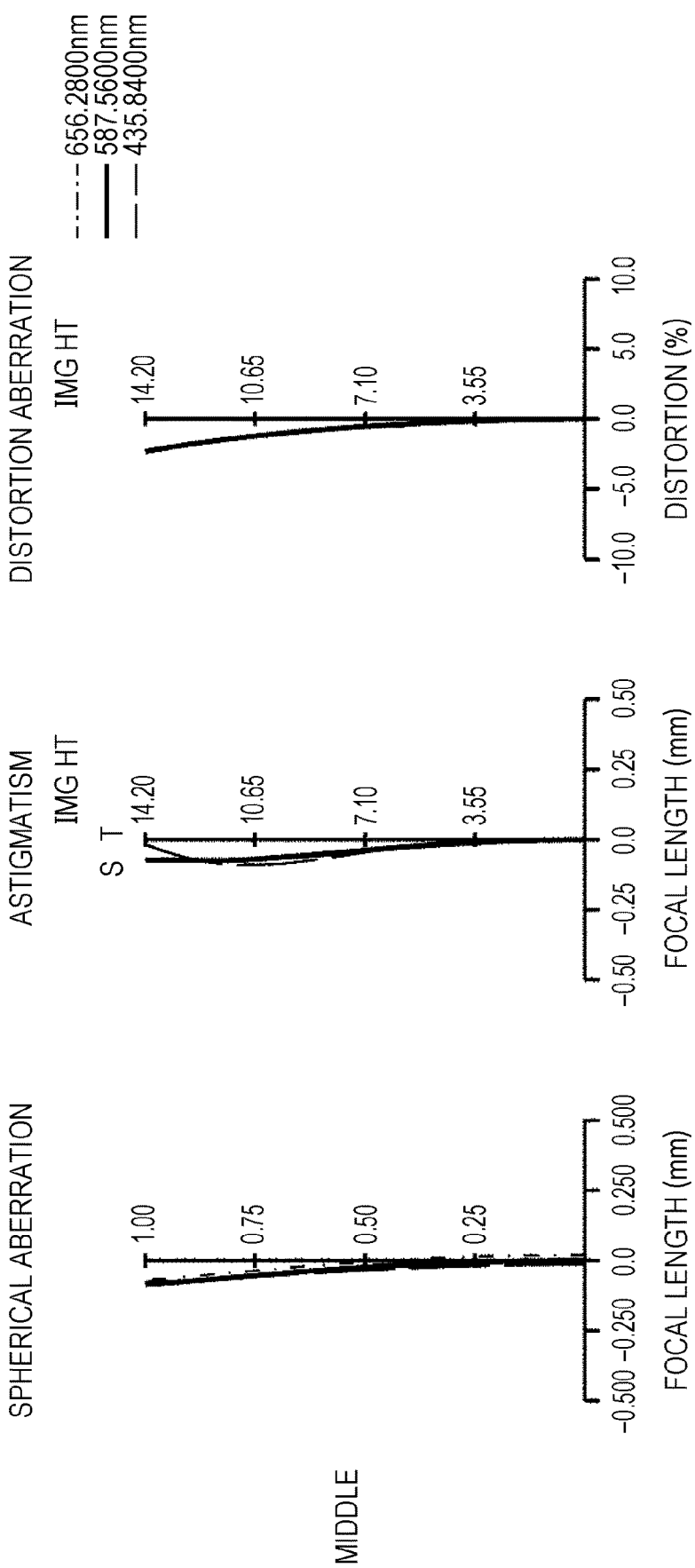

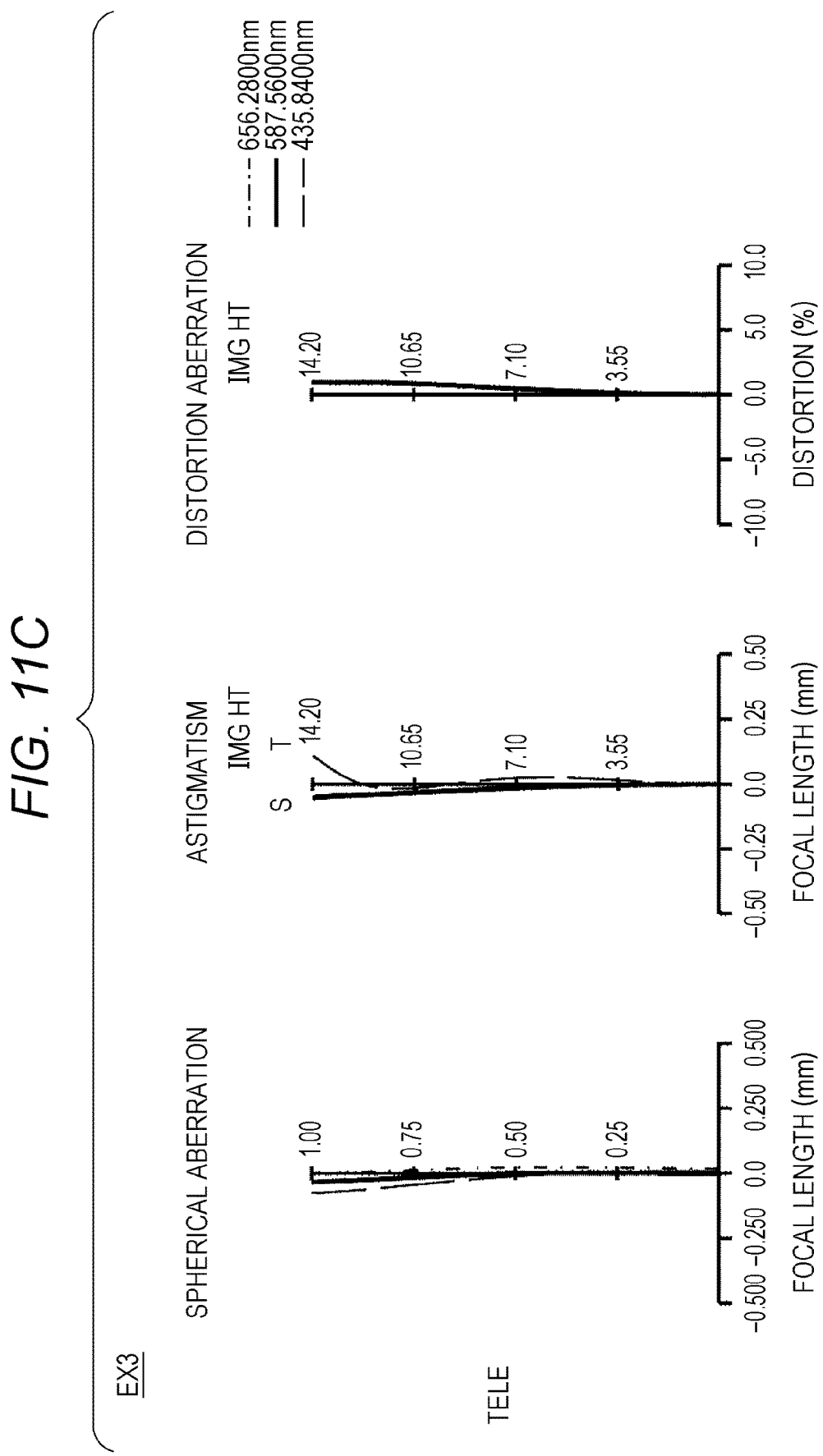

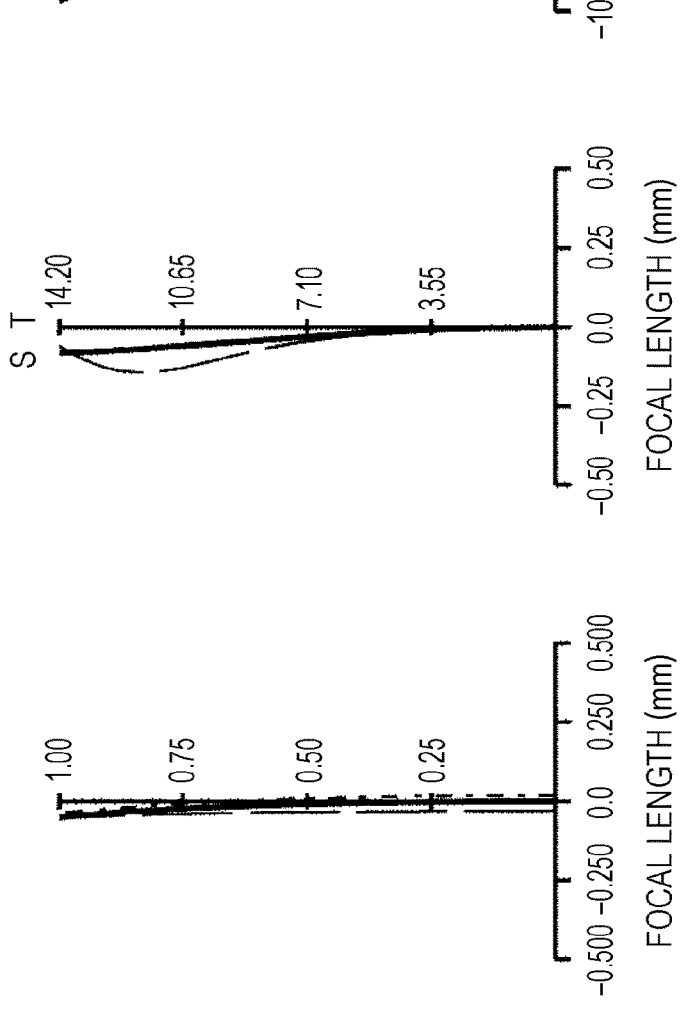

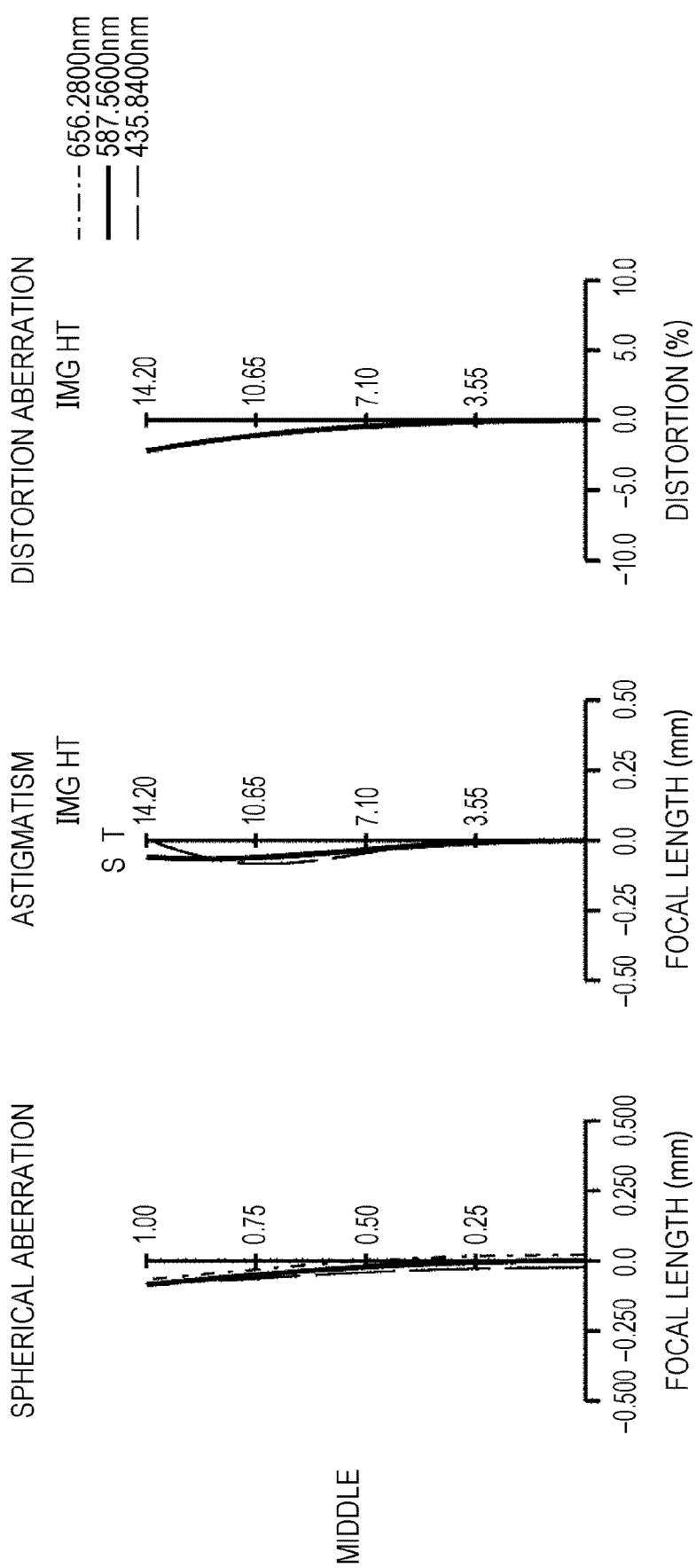

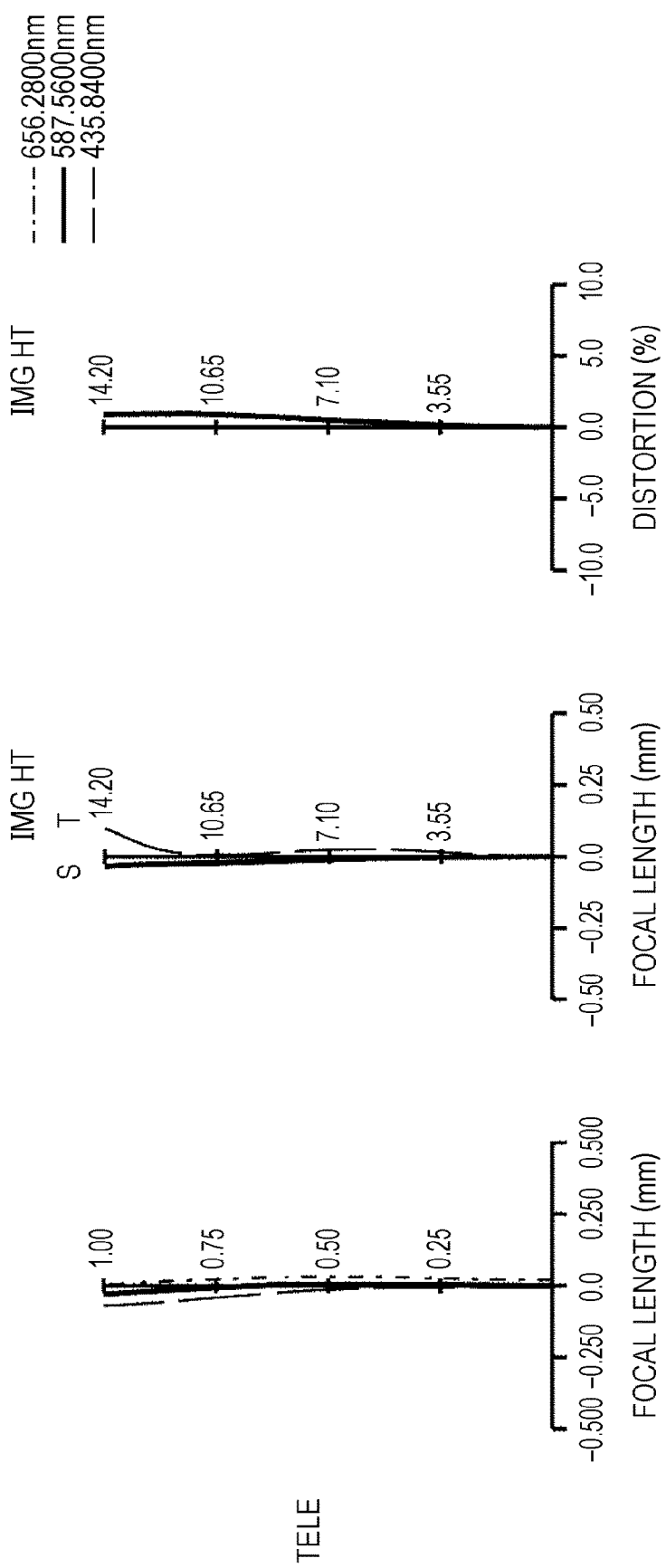

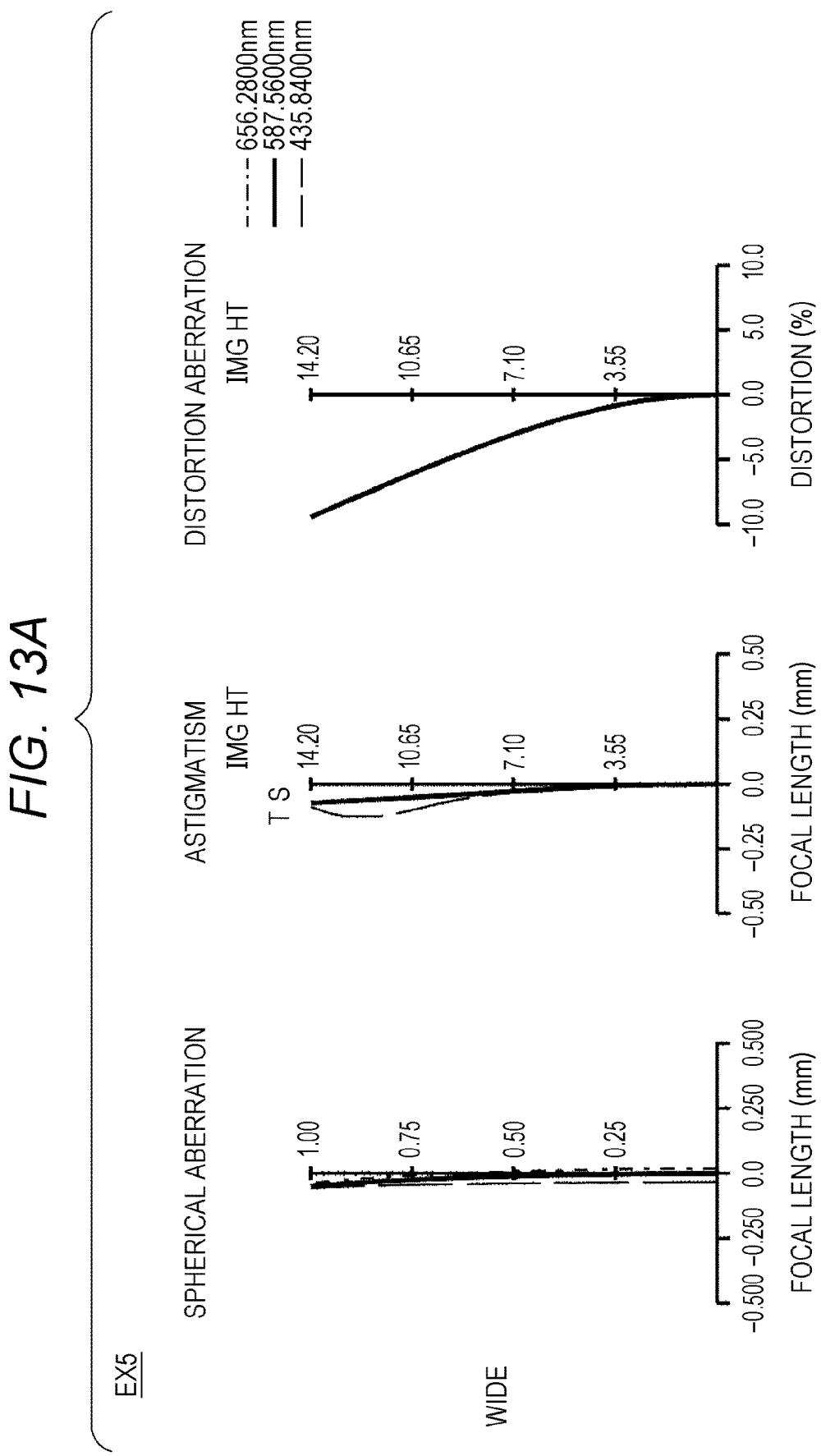

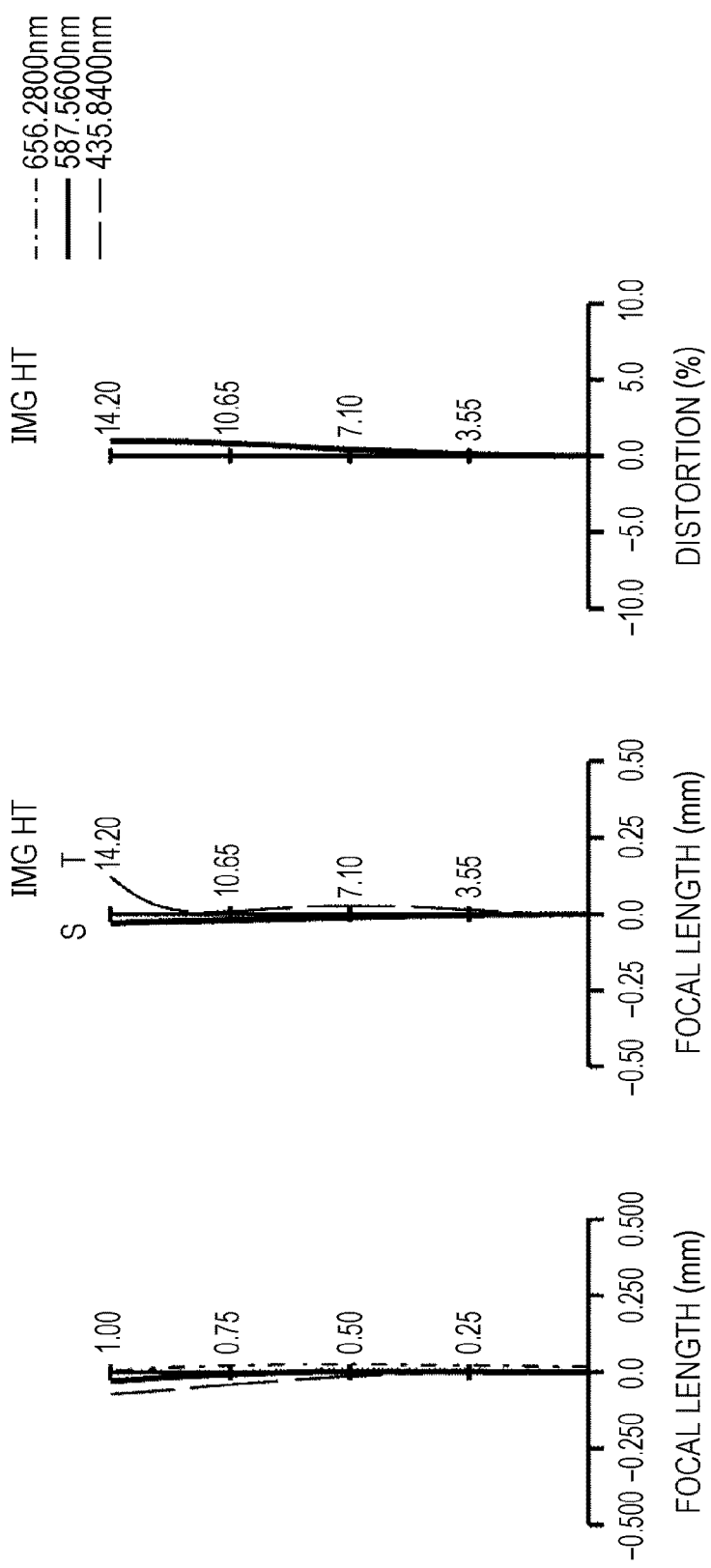

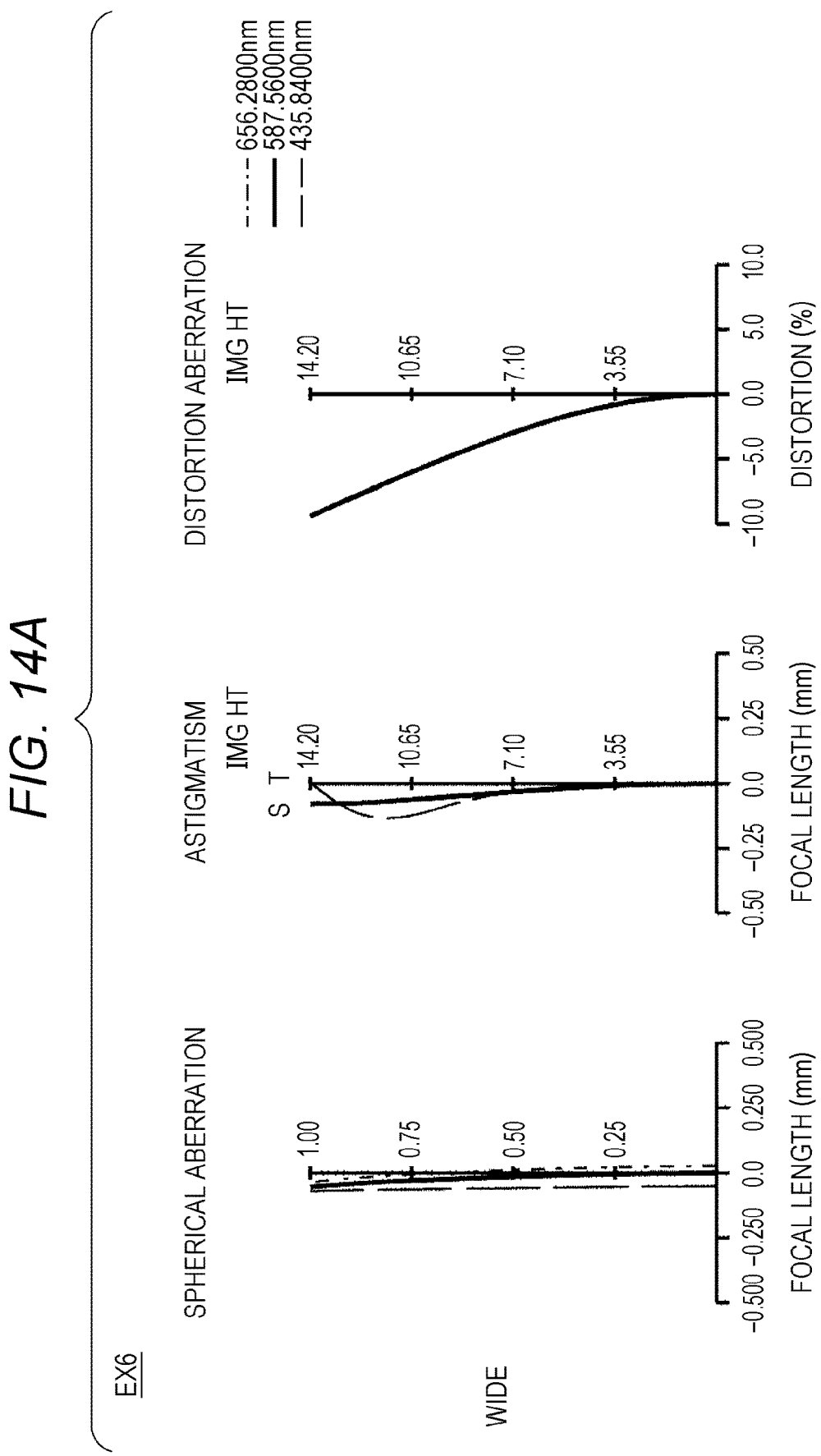

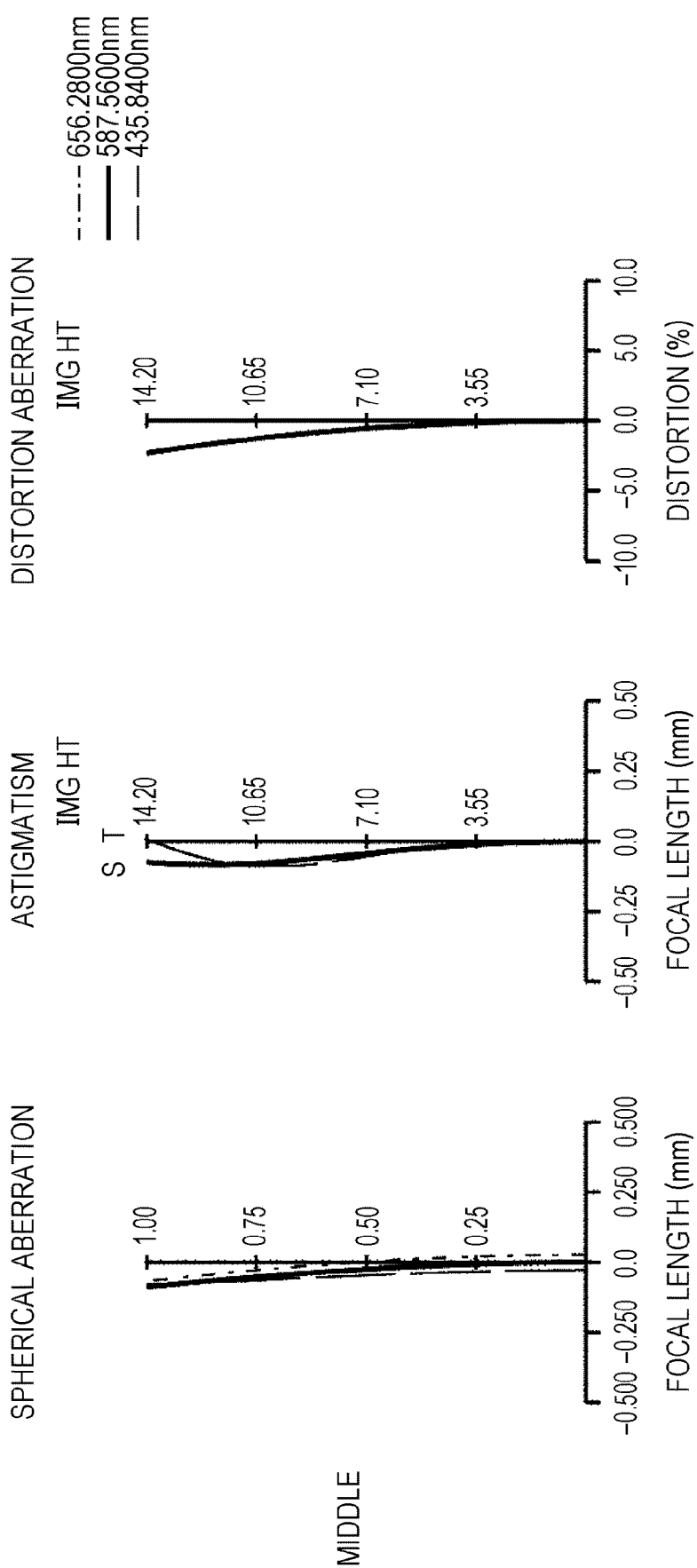

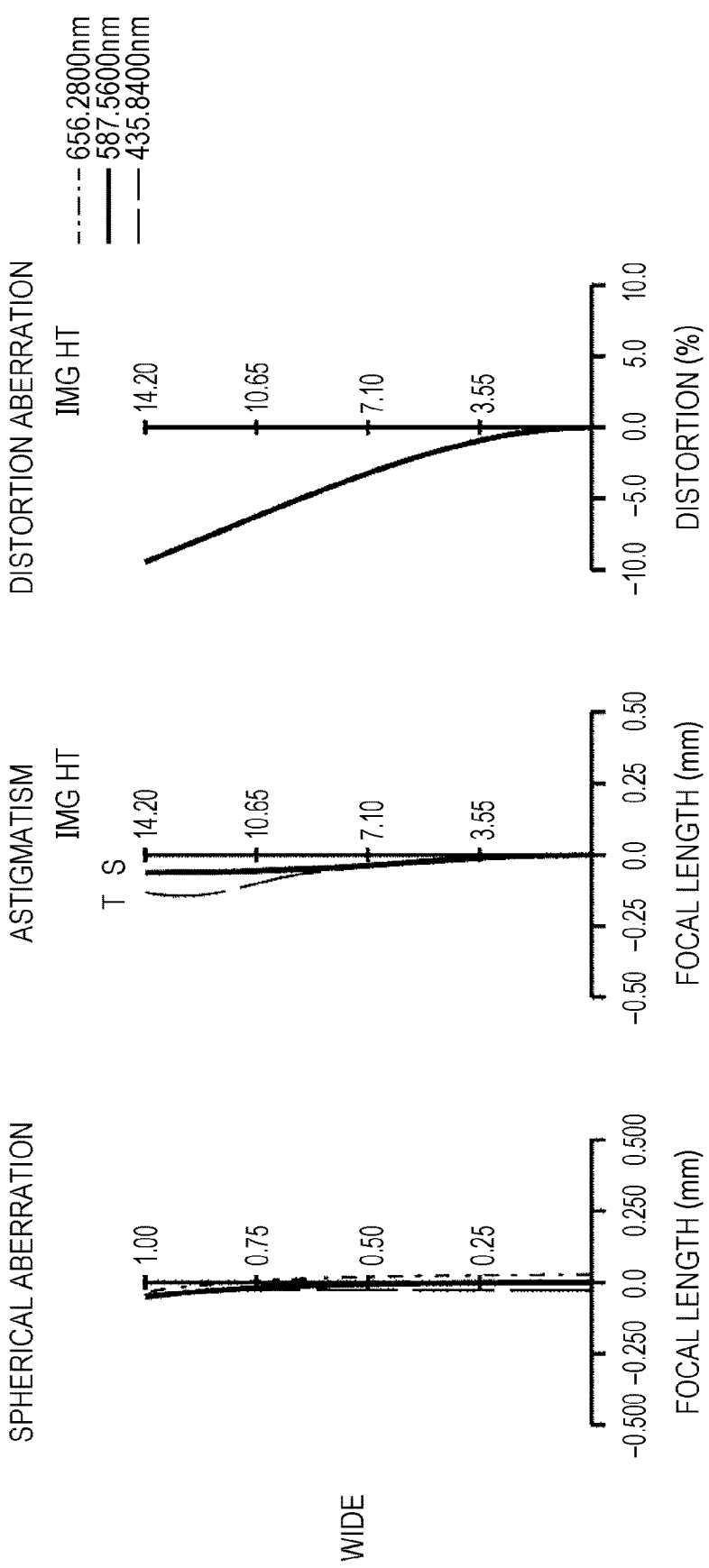

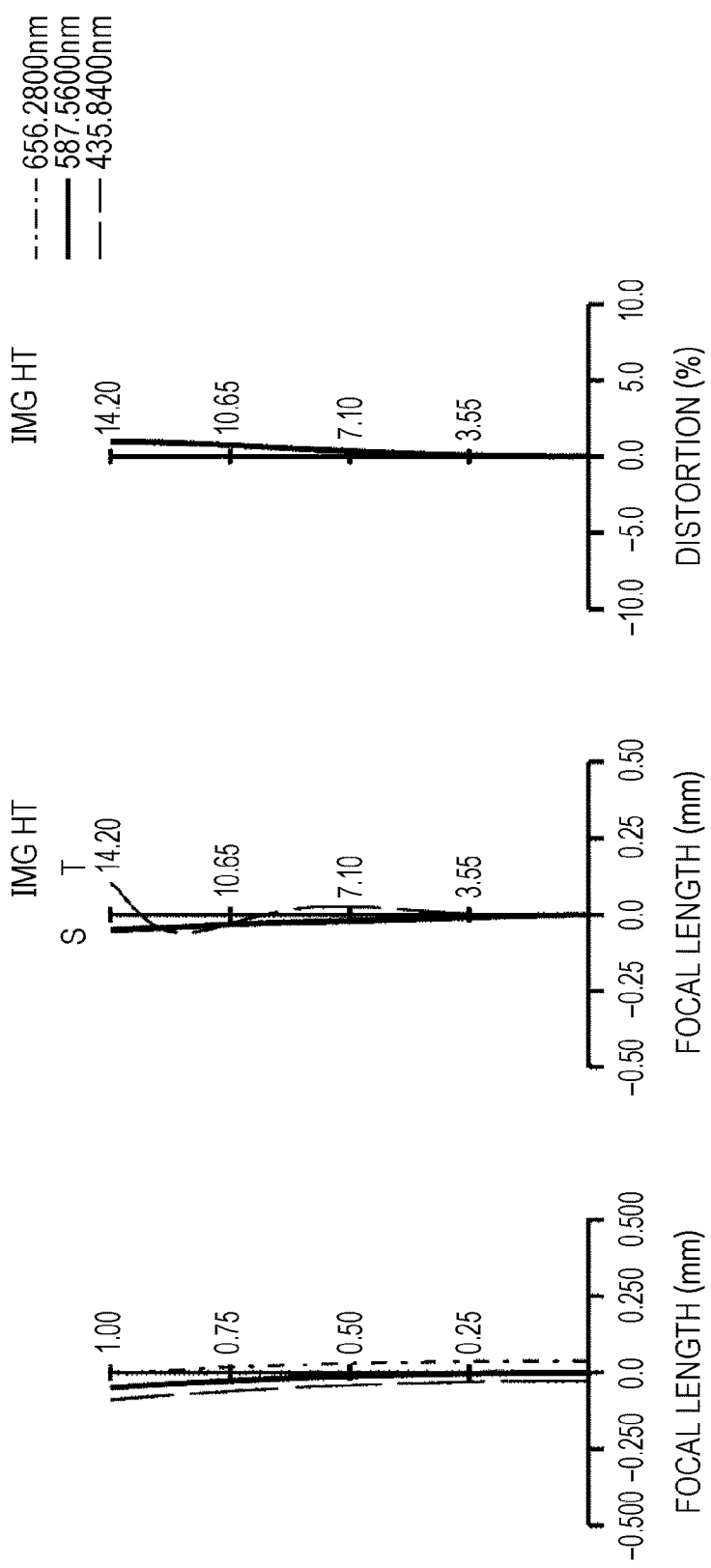

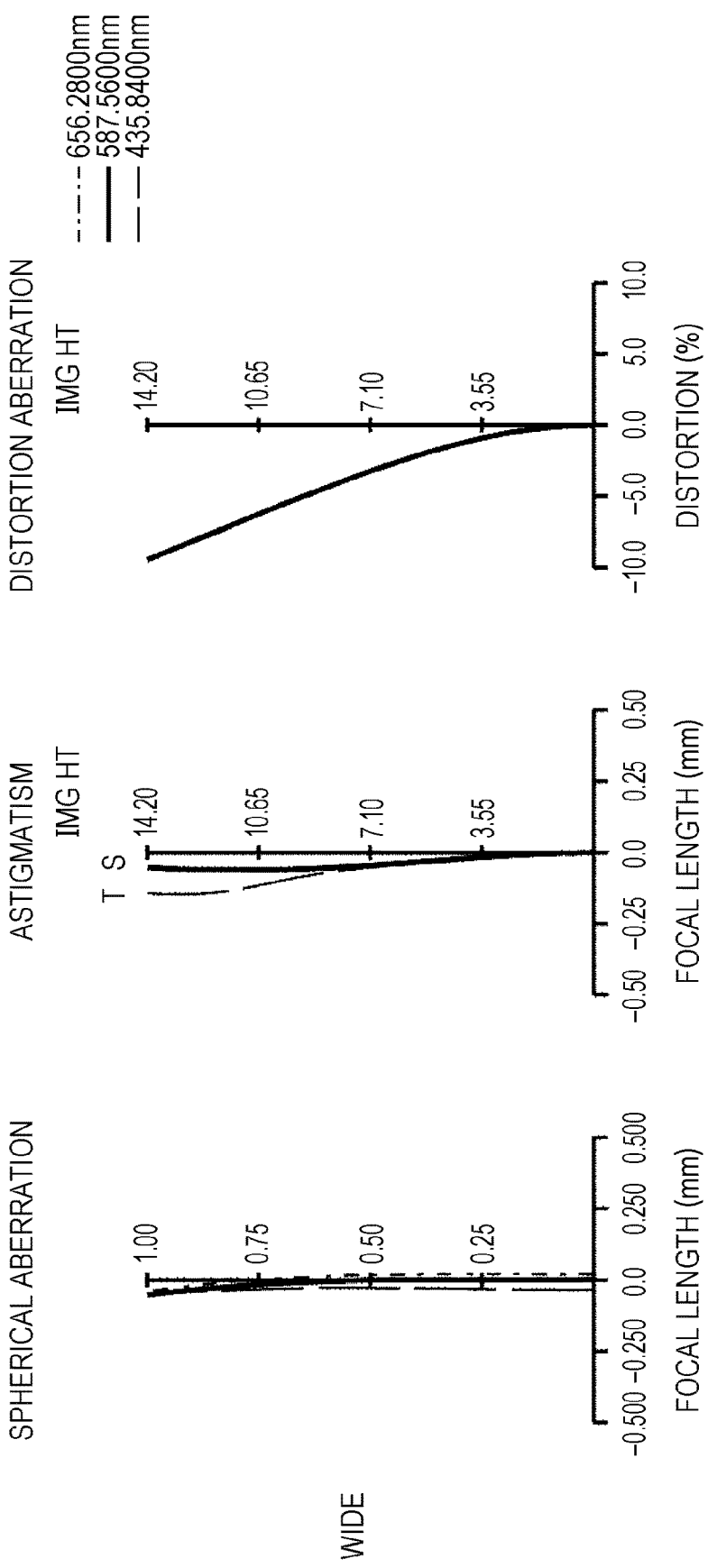

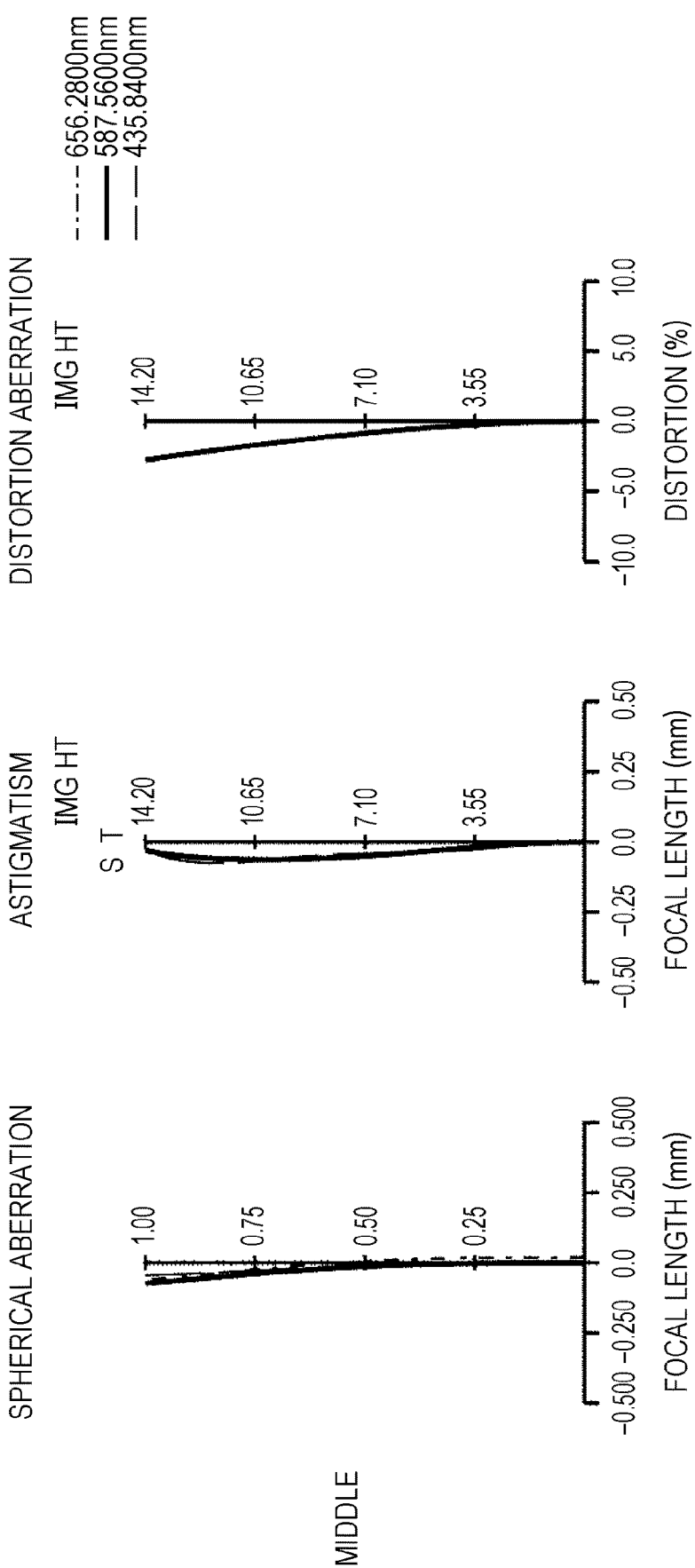

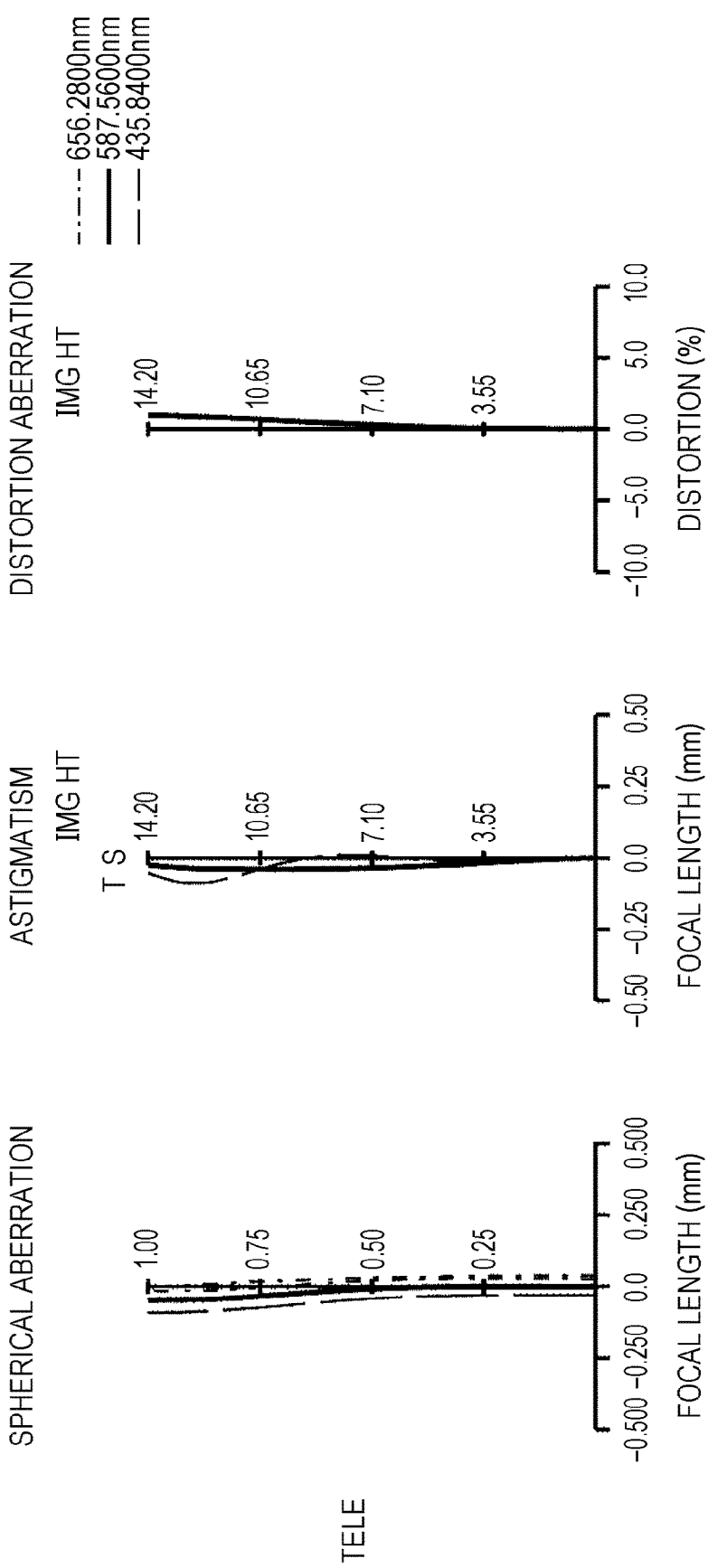

ZOOM LENS, IMAGE PICKUP OPTICAL DEVICE, AND DIGITAL APPARATUS

The entire disclosure of Japanese patent Application No. 2019-096880, filed on May 23, 2019, is incorporated herein by reference in its entirety.

BACKGROUND

Technological Field

The present disclosure relates to a zoom lens, an image pickup optical device, and a digital apparatus.

Description of the Related Art

Various zoom lenses each having a small f-number (e.g., approximately F 2.8) have been proposed until now. For example, JP 2014-106243 A and JP 2016-109720 A each disclose a zoom lens including, in order from the object side, a first lens group having positive refractive power, a second lens group having negative refractive power, a third lens group having positive refractive power, a fourth lens group having negative refractive power, and a fifth lens group having positive refractive power.

For recent zoom lenses, there has been a strong demand for not only angle widening and high resolving power but also brightness equivalent to that of single focus. The respective zoom lenses disclosed in JP 2014-106243 A and JP 2016-109720 A have an f-number of approximately 2.8. The respective zoom lenses disclosed in the patent documents have five groups in configuration. For such a zoom lens having five groups in configuration, as the f-number decreases, spherical aberration and coma aberration vary largely due to zooming. Thus, aberration is difficult to correct favorably over the entire range of zooming.

SUMMARY

The present invention has been made in consideration of such a problem, and an object of the present invention is to provide a zoom lens corrected favorably in aberration, having a wide angle of view at the wide end thereof and f-number small over the entire range of zooming, an image pickup optical device including the zoom lens, and a digital apparatus.

To achieve the abovementioned object, according to an aspect of the present invention, a zoom lens reflecting one aspect of the present invention comprises, in order from an object side: a first lens group having positive refractive power; a second lens group having negative refractive power; a third lens group; a fourth lens group having positive refractive power; a fifth lens group having negative refractive power; and a sixth lens group having positive refractive power, wherein, during zooming, an interval between adjacent two lens groups varies among the first lens group, the second lens group, the third lens group, the fourth lens group, the fifth lens group, and the sixth lens group, the sixth lens group includes at least one negative lens, and the following Conditional Expression (1) is satisfied:

$$0 < ft/fl \leq 0.42 \tag{1}$$

where ft represents a focal length of an entire system at a tele end, and fl represents a focal length of the first lens group.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 2A to 2C illustrate the configuration of a zoom lens according to a second embodiment;

FIGS. 9A to 9C are longitudinal aberration diagrams of Example 1;

FIGS. 10A to 10C are longitudinal aberration diagrams of Example 2;

FIGS. 11A to 11C are longitudinal aberration diagrams of Example 3;

FIGS. 12A to 12C are longitudinal aberration diagrams of Example 4;

FIGS. 13A to 13C are longitudinal aberration diagrams of Example 5;

FIGS. 14A to 14C are longitudinal aberration diagrams of Example 6;

FIGS. 15A to 15C are longitudinal aberration diagrams of Example 7;

FIGS. 16A to 16C are longitudinal aberration diagrams of Example 8; and

DETAILED DESCRIPTION OF EMBODIMENTS

Figure 1A:
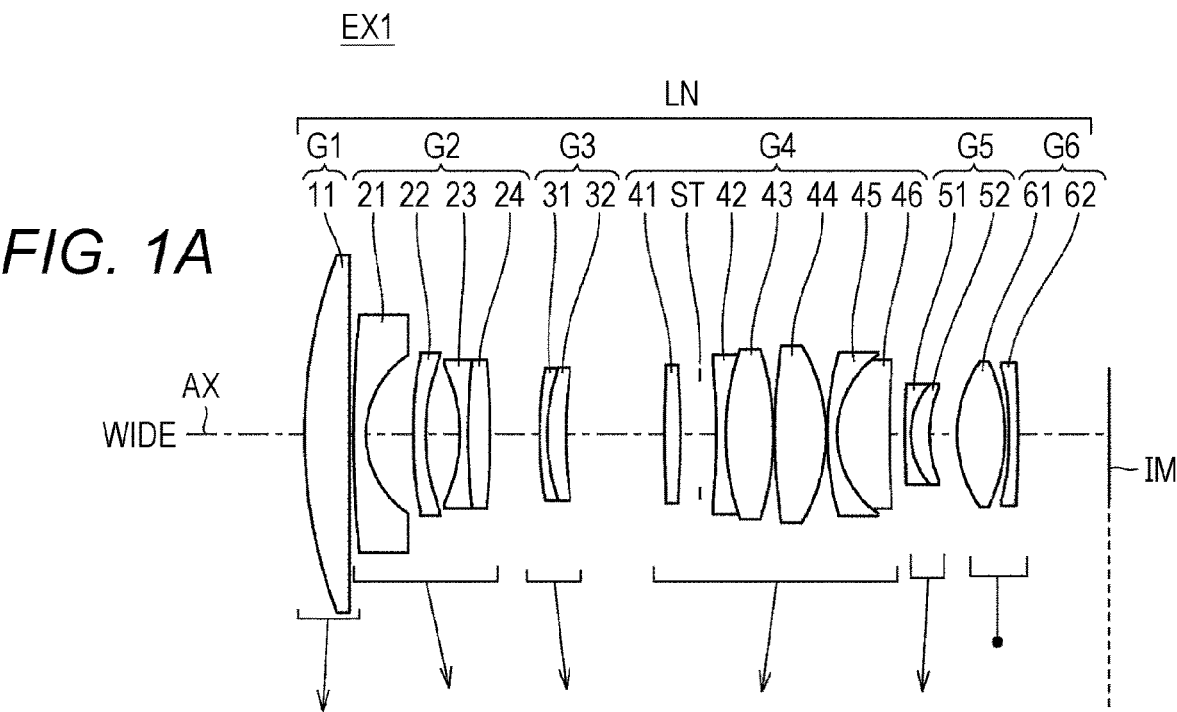
FIGS. 1A to 1C illustrate the configuration of a zoom lens according to a first embodiment.

Hereinafter, one or more embodiments of the present invention will be described with reference to the drawings. However, the scope of the invention is not limited to the disclosed embodiments. A zoom lens according to an embodiment of the present invention includes, in order from the object side, a first lens group having positive refractive power, a second lens group having negative refractive power, a third lens group, a fourth lens group having positive refractive power, a fifth lens group having negative refractive power, and a sixth lens group having positive refractive power. During zooming, the interval between adjacent two lens groups varies among the first lens group, the second lens group, the third lens group, the fourth lens group, the fifth lens group, and the sixth lens group. The sixth lens group includes at least one negative lens. The following Conditional Expression (1) is satisfied:

$$0 < ft/fl \leq 0.42 \tag{1}$$

where ft represents the focal length of the entire system at the tele end and fl represents the focal length of the first lens group.

The zoom lens has six lens groups. During zooming, the interval between adjacent two lens groups varies. The third lens group provided movably and the sixth lens group including at least one negative lens enable inhibition of aberration variation due to zooming, in comparison with a zoom lens having five groups in configuration.

Conditional Expression (1) regulates the condition for achievement of angle widening at the wide end and favorable correction of aberration over a wide zooming range, with the focal length of the first lens group properly set. If the value of ft/fl falls below the lower limit of Conditional Expression (1), the power of the first lens group becomes insufficient. Thus, distortion is difficult to correct in the range of a wide angle of view, such as the maximum image height, at the wide end. Furthermore, because of the insufficient power of the first lens group, the subsequent lens groups (namely, the second lens group and the subsequent lens groups) needs increasing in lens diameter. However, an increase in lens diameter causes the weight of the entire lens to increase. Meanwhile, if the value of ft/fl exceeds the upper limit of Conditional Expression (1), the power of the first lens group strengthens excessively. Thus, spherical aberration and coma aberration that occur in the first lens group increase particularly at the tele end. Use of glass material high in refractive index for a positive lens in the first lens group is effective in correcting such aberration. However, the use of glass material high in refractive index for a positive lens in the first lens group causes high turbulence. Thus, on-axis chromatic aberration is difficult to correct particularly at the tele end. Furthermore, widening of an angle of view is insufficient at the wide end. The value of ft/fl satisfying Conditional Expression (1) enables acquisition of an f-number of F 2.2 or less over the entire range of zooming with an angle of view of more than 80° at the wide end and enables favorable correction of aberration.

In the present embodiment, preferably, ft/fl satisfies the following Conditional Expression (1a):

$$0 < ft/fl \leq 0.3 \qquad (1a)$$

where ft represents the focal length of the entire system at the tele end and fl represents the focal length of the first lens group.

Conditional Expression (1a) regulates a further preferable conditional range from the conditional range regulated by Conditional Expression (1) above. Therefore, the value of ft/fl satisfying Conditional Expression (1a) enables further enhancement of the effect.

In the present embodiment, more preferably, ft/fl satisfies the following Conditional Expression (1b):

$$0 < ft/fl \leq 0.2 \qquad (1b)$$

where ft represents the focal length of the entire system at the tele end and fl represents the focal length of the first lens group.

Conditional Expression (1b) regulates a more preferable conditional range than the conditional range regulated by Conditional Expression (1a) above. Therefore, the value of ft/fl satisfying Conditional Expression (1b) enables further enhancement of the effect.

In the present embodiment, preferably, the second lens group includes at least one cemented lens satisfying the following Conditional Expression (2):

$$nd2p - nd2n \geq 0.1 \qquad (2)$$

where nd2p represents the refractive index for the d line of a positive lens in the cemented lens in the second lens group and nd2n represents the refractive index for the d line of a negative lens in the cemented lens in the second lens group.

Conditional Expression (2) regulates the condition for correction of coma aberration at the wide end and correction of spherical aberration at the tele end with at least one cemented face having a large difference in refractive index arranged in the second lens group. If the value of (nd2p−nd2n) falls below the lower limit of Conditional Expression (2), the difference between nd2p and nd2n diminishes excessively. Thus, correction of at least one of the coma aberration at the wide end and the spherical aberration at the tele end is likely to be insufficient.

In the present embodiment, preferably, the value of (nd2p−nd2n) satisfies the following Conditional Expression (2a):

$$nd2p - nd2n \geq 0.15 \qquad (2a)$$

where nd2p represents the refractive index for the d line of a positive lens in the cemented lens in the second lens group and nd2n represents the refractive index for the d line of a negative lens in the cemented lens in the second lens group.

Conditional Expression (2a) regulates a further preferable conditional range from the conditional range regulated by Conditional Expression (2) above. Therefore, the value of (nd2p−nd2n) satisfying Conditional Expression (2a) enables further enhancement of the effect.

In the present embodiment, more preferably, the value of (nd2p−nd2n) satisfies the following Conditional Expression (2b):

$$nd2p - nd2n \geq 0.25 \qquad (2b)$$

where nd2p represents the refractive index for the d line of a positive lens in the cemented lens in the second lens group and nd2n represents the refractive index for the d line of a negative lens in the cemented lens in the second lens group.

Conditional Expression (2b) regulates a more preferable conditional range than the conditional range regulated by Conditional Expression (2a) above. Therefore, the value of (nd2p−nd2n) satisfying Conditional Expression (2b) enables further enhancement of the effect.

In the present embodiment, the lens groups on the image side from the fourth lens group include at least three positive lenses satisfying the following Conditional Expression (3):

$$vdp \geq 60 \qquad (3)$$

where vdp represents the Abbe's number of each positive lens arranged on the image side from the fourth lens group.

The at least three positive lenses satisfying Conditional Expression (3), arranged in the lens groups arranged on the image side from the fourth lens group, enables favorable correction of on-axis chromatic aberration and zooming chromatic aberration.

In the present embodiment, preferably, the at least three positive lenses each satisfy the following Conditional Expression (3a):

$$vdp \geq 65 \qquad (3a)$$

where vdp represents the Abbe's number of each positive lens arranged on the image side from the fourth lens group.

Conditional Expression (3a) regulates a further preferable conditional range from the conditional range regulated by Conditional Expression (3) above. Therefore, the value of vdp satisfying Conditional Expression (3a) enables further enhancement of the effect.

In the present embodiment, preferably, the fourth lens group satisfies the following Conditional Expression (4):

$$0.6 \leq f4/ft \leq 1.6 \qquad (4)$$

where f4 represents the focal length of the fourth lens group.

Conditional Expression (4) regulates the condition for achievement of angle widening at the wide end and favorable correction of aberration over a wide zooming range, with the focal length of the fourth lens group properly set. If the value of f4/ft falls below the lower limit of Conditional Expression (4), the power of the fourth lens group strengthens excessively. Thus, spherical aberration varies largely mainly during zooming. Meanwhile, if the value of f4/ft exceeds the upper limit of Conditional Expression (4), the power of the fourth lens group weakens excessively. Thus, the negative power of the second lens group needs weakening. However, if the negative power of the second lens group decreases, angle widening is difficult to achieve at the wide end.

In the present embodiment, preferably, f4/ft satisfies the following Conditional Expression (4a):

$$0.8 \leq f4/ft \leq 1.5 \tag{4a}$$

where f4 represents the focal length of the fourth lens group.

Conditional Expression (4a) regulates a further preferable conditional range from the conditional range regulated by Conditional Expression (4) above. Therefore, the value of f4/ft satisfying Conditional Expression (4a) enables further enhancement of the effect.

In the present embodiment, the fifth lens group moves on the optical axis in focusing from a far-distance object to a near-distance object, and preferably the following Conditional Expression (5) is satisfied:

$$-2.0 \leq f5/f6 \leq -0.5 \tag{5}$$

where f5 represents the focal length of the fifth lens group and f6 represents the focal length of the sixth lens group.

Conditional Expression (5) is for inhibition of aberration variation due to focusing, with a ratio in focal length properly set between the fifth lens group and the sixth lens group. The sixth lens group of which refractive power is positive corrects aberration that occurs due to movement of the fifth lens group of which refractive power is negative. If f5/f6 falls below the lower limit of Conditional Expression (5), the power of the fifth lens group to the sixth lens group weakens excessively. Thus, the sixth lens group makes excessive aberration correction, for example, to the variation of field curvature that occurs in the fifth lens group during focusing. Meanwhile, if f5/f6 exceeds the upper limit of Conditional Expression (5), the power of the fifth lens group to the sixth lens group strengthens excessively. Thus, the sixth lens group makes insufficient aberration correction, for example, to the variation of field curvature that occurs in the fifth lens group during focusing.

In the present embodiment, preferably, f5/f6 satisfies the following Conditional Expression (5a):

$$-1.7 \leq f5/f6 \leq -0.8 \tag{5a}$$

where f5 represents the focal length of the fifth lens group and f6 represents the focal length of the sixth lens group.

Conditional Expression (5a) regulates a further preferable conditional range from the conditional range regulated by Conditional Expression (5) above. Therefore, the value of f5/f6 satisfying Conditional Expression (5a) enables further enhancement of the effect.

In the present embodiment, preferably, the first lens group includes one positive lens.

The first lens group of the zoom lens of which angle of view is wide at the wide end (e.g., an angle of view of more than 80° at the wide end), is considerably large in lens diameter. The first lens group including one positive lens enables achievement of weight reduction of the entire zoom lens.

<Specific Optical Configurations of Zoom Lenses According to Embodiments of Present Invention>

FIGS. 1A to 8C are lens diagrams of the configurations of zoom lenses LN according to first to eighth embodiments, respectively. In FIGS. 1A to 8C, the first to eighth embodiments are denoted with "EX1" to "EX8", respectively. In FIGS. 1A to 8C, each A are a lens sectional view at the wide end (WIDE). Each B are a lens sectional view in the intermediate focal-length state (MIDDLE). Each C are a lens sectional view at the tele end (TELE). In FIGS. 1A to 8C, "AX" represents the optical axis. FIGS. 1A to 8C each are a lens sectional view at the time of focusing on an infinite-distance object.

First Embodiment

Figure 1B:
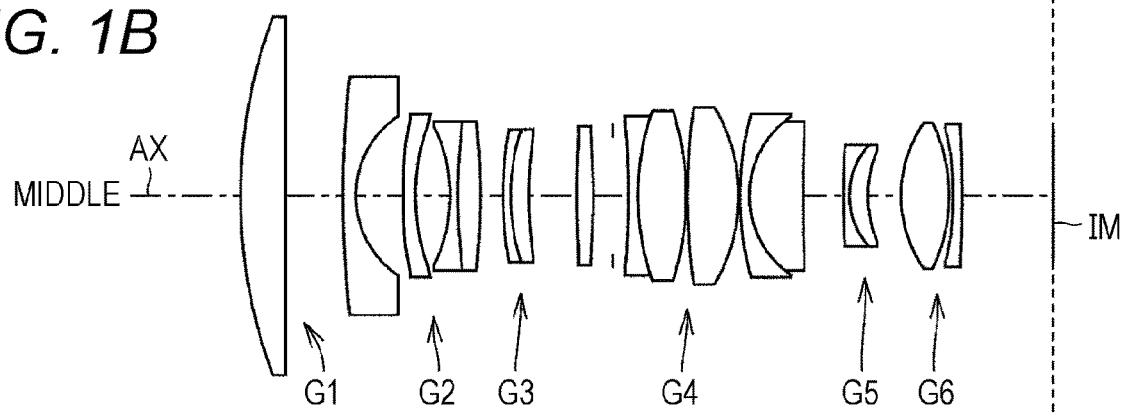
Figure 1C:
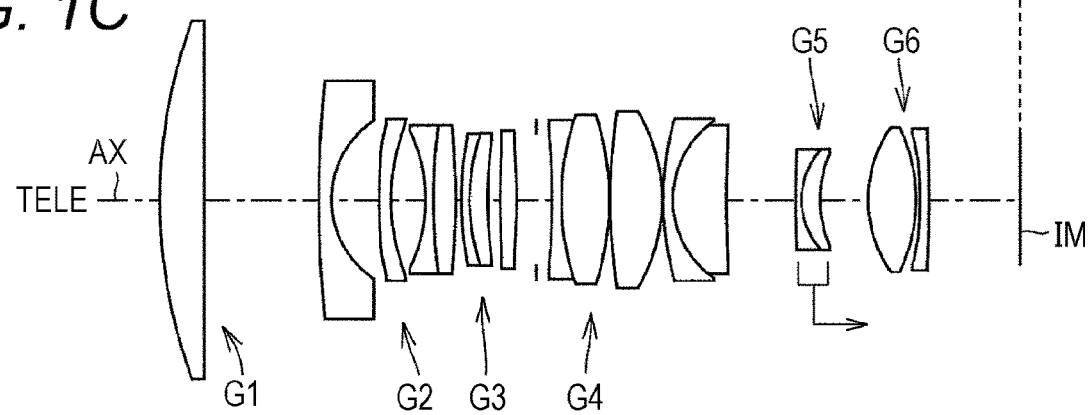

As illustrated in FIGS. 1A to 1C, the zoom lens LN according to the first embodiment includes, in order from the object side, a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power. During zooming, the interval between adjacent two lens groups varies among the first lens group G1, the second lens group G2, the third lens group G3, the fourth lens group G4, the fifth lens group G5, and the sixth lens group G6. The first to fifth lens groups move with the sixth lens group fixed. At the time of focusing from a far-distance object to a near-distance object, the fifth lens group G5 moves toward the image plane IM along the optical axis AX.

Referring to FIGS. 1A to 1C, arrows indicate the movement loci of the lens groups at the time of zooming from the wide end to the tele end. An arrow related to focus indicates the movement direction of the lens group at the time of focusing from the far-distance object to the near-distance object (similarly in FIGS. 2A to 8C).

The first lens group G1 includes one positive lens 11. The positive lens 11 is a positive meniscus lens having a convex face facing the object side.

The second lens group G2 includes a negative meniscus lens 21 having a convex face facing the object side, a negative meniscus lens 22 having a convex face facing the object side, a biconcave negative lens 23, and a positive lens 24. The negative lens 23 and the positive lens 24 cemented together forms a cemented lens. In the first embodiment, the positive lens 24 is a biconvex lens.

The third lens group G3 includes a negative meniscus lens 31 having a convex face facing the object side and a positive meniscus lens 32 having a convex face facing the object side. The negative meniscus lens 31 and the positive meniscus lens 32 cemented together forms a cemented lens.

The fourth lens group G4 includes a biconvex positive lens 41, a biconcave negative lens 42, a biconvex positive lens 43, a biconvex positive lens 44, a negative meniscus lens 45 having a convex face facing the object side, and a positive lens 46. The negative lens 42 and the positive lens 43 cemented together forms a cemented lens. The negative meniscus lens 45 and the positive lens 46 cemented together forms a cemented lens. In the first embodiment, the positive lens 46 is a positive meniscus lens having a convex face facing the object side. An aperture stop ST is arranged between the positive lens 41 and the negative lens 42.

The fifth lens group G5 includes a negative meniscus lens 51 having a convex face facing the object side and a positive meniscus lens 52 having a convex face facing the object side. The negative meniscus lens 51 and the positive meniscus lens 52 cemented together forms a cemented lens.

The sixth lens group G6 includes a biconvex positive lens 61 and a negative lens 62. In the third embodiment, the negative lens 62 is a plano-concave lens having a concave on the object side.

Second Embodiment

As illustrated in FIGS. 2A to 2C, the zoom lens LN according to the second embodiment includes, in order from the object side, a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power. During zooming, the interval between adjacent two lens groups varies among the first lens group G1, the second lens group G2, the third lens group G3, the fourth lens group G4, the fifth lens group G5, and the sixth lens group G6. The first to fifth lens groups move with the sixth lens group fixed. At the time of focusing from a far-distance object to a near-distance object, the fifth lens group G5 moves toward the image plane IM along the optical axis AX.

The first lens group G1 includes one positive lens 11. The positive lens 11 is a positive meniscus lens having a convex face facing the object side.

The second lens group G2 includes a negative meniscus lens 21 having a convex face facing the object side, a negative meniscus lens 22 having a convex face facing the object side, a biconcave negative lens 23, and a positive lens 24. The negative lens 23 and the positive lens 24 cemented together forms a cemented lens. In the second embodiment, the positive lens 24 is a plano-convex lens having a convex face facing the object side.

The third lens group G3 includes a negative meniscus lens 31 having a convex face facing the object side and a positive meniscus lens 32 having a convex face facing the object side. The negative meniscus lens 31 and the positive meniscus lens 32 cemented together forms a cemented lens.

The fourth lens group G4 includes a biconvex positive lens 41, a biconcave negative lens 42, a biconvex positive lens 43, a biconvex positive lens 44, a negative meniscus lens 45 having a convex face facing the object side, and a positive lens 46. The negative lens 42 and the positive lens 43 cemented together forms a cemented lens. The negative meniscus lens 45 and the positive lens 46 cemented together forms a cemented lens. In the second embodiment, the positive lens 46 is a biconvex lens. An aperture stop ST is arranged between the positive lens 41 and the negative lens 42.

The fifth lens group G5 includes a negative meniscus lens 51 having a convex face facing the object side and a positive meniscus lens 52 having a convex face facing the object side. The negative meniscus lens 51 and the positive meniscus lens 52 cemented together forms a cemented lens.

The sixth lens group G6 includes a biconvex positive lens 61 and a negative lens 62. In the eighth embodiment, the negative lens 62 is a negative meniscus lens having a convex face facing the object side.

Third Embodiment

Figure 3A:
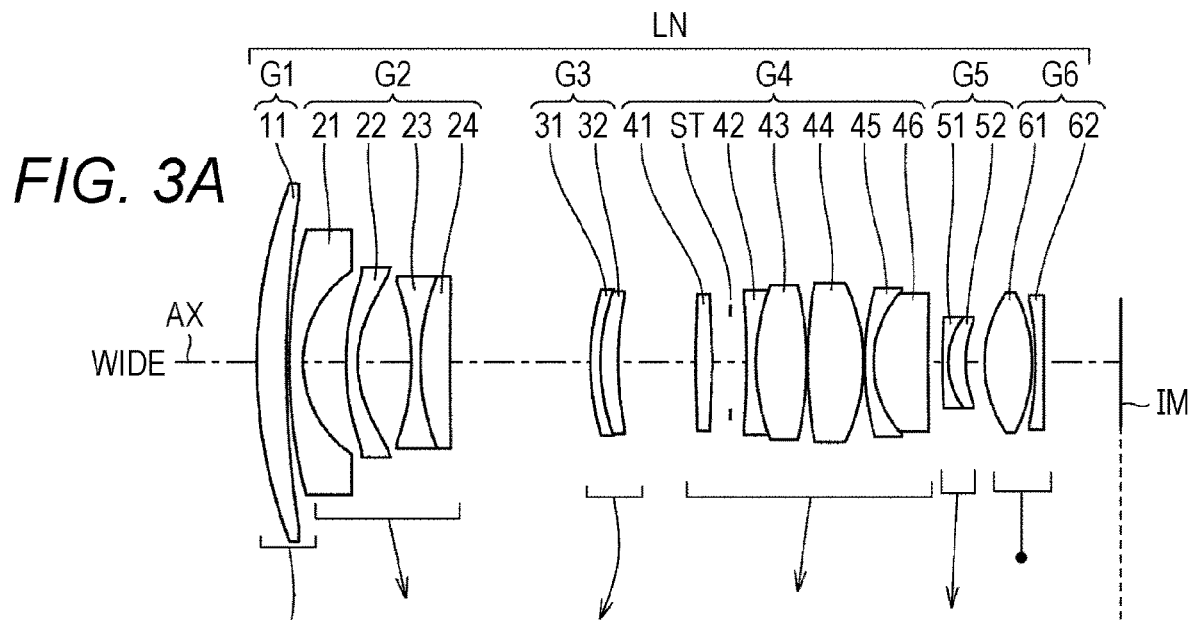
FIGS. 3A to 3C illustrate the configuration of a zoom lens according to a third embodiment.
Figure 3B:
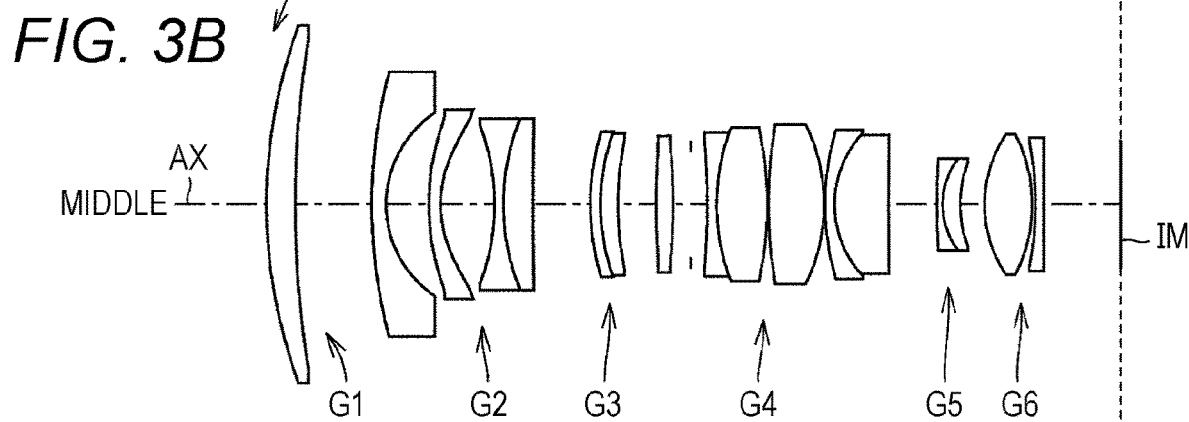
Figure 3C:
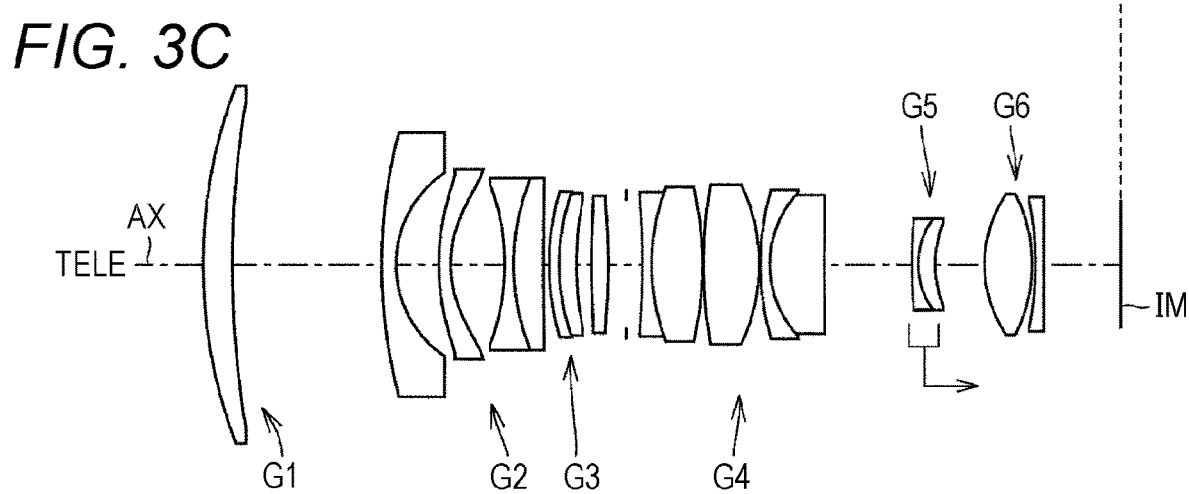

As illustrated in FIGS. 3A to 3C, the zoom lens LN according to the third embodiment includes, in order from the object side, a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power. During zooming, the interval between adjacent two lens groups varies among the first lens group G1, the second lens group G2, the third lens group G3, the fourth lens group G4, the fifth lens group G5, and the sixth lens group G6. The first to fifth lens groups move with the sixth lens group fixed. At the time of focusing from a far-distance object to a near-distance object, the fifth lens group G5 moves toward the image plane IM along the optical axis AX.

The first lens group G1 includes one positive lens 11. The positive lens 11 is a positive meniscus lens having a convex face facing the object side.

The second lens group G2 includes a negative meniscus lens 21 having a convex face facing the object side, a negative meniscus lens 22 having a convex face facing the object side, a biconcave negative lens 23, and a positive lens 24. The negative lens 23 and the positive lens 24 cemented together forms a cemented lens. In the third embodiment, the positive lens 24 is a positive meniscus lens having a convex face facing the object side.

The third lens group G3 includes a negative meniscus lens 31 having a convex face facing the object side and a positive meniscus lens 32 having a convex face facing the object side. The negative meniscus lens 31 and the positive meniscus lens 32 cemented together forms a cemented lens.

The fourth lens group G4 includes a biconvex positive lens 41, a biconcave negative lens 42, a biconvex positive lens 43, a biconvex positive lens 44, a negative meniscus lens 45 having a convex face facing the object side, and a positive lens 46. The negative lens 42 and the positive lens 43 cemented together forms a cemented lens. The negative meniscus lens 45 and the positive lens 46 cemented together forms a cemented lens. In the third embodiment, the positive lens 46 is a positive meniscus lens having a convex face facing the object side. An aperture stop ST is arranged between the positive lens 41 and the negative lens 42.

The fifth lens group G5 includes a negative meniscus lens 51 having a convex face facing the object side and a positive meniscus lens 52 having a convex face facing the object side. The negative meniscus lens 51 and the positive meniscus lens 52 cemented together forms a cemented lens.

The sixth lens group G6 includes a biconvex positive lens 61 and a negative lens 62. In the third embodiment, the negative lens 62 is a plano-concave lens having a concave on the object side.

Fourth Embodiment

Figure 4A:
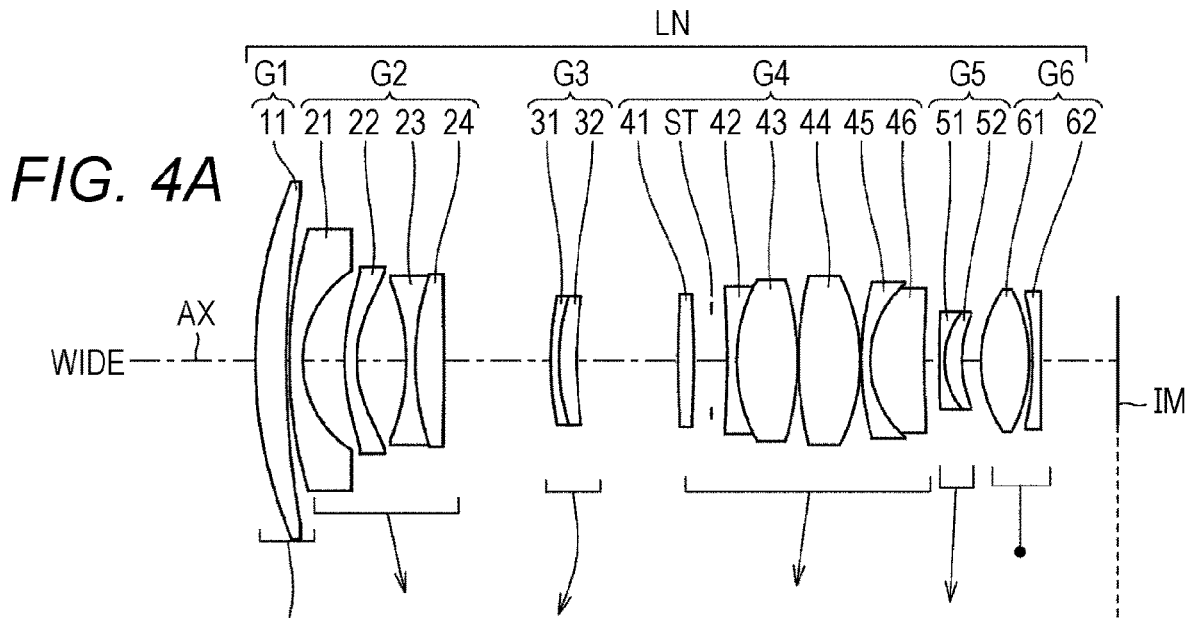
FIGS. 4A to 4C illustrate the configuration of a zoom lens according to a fourth embodiment.
Figure 4B:
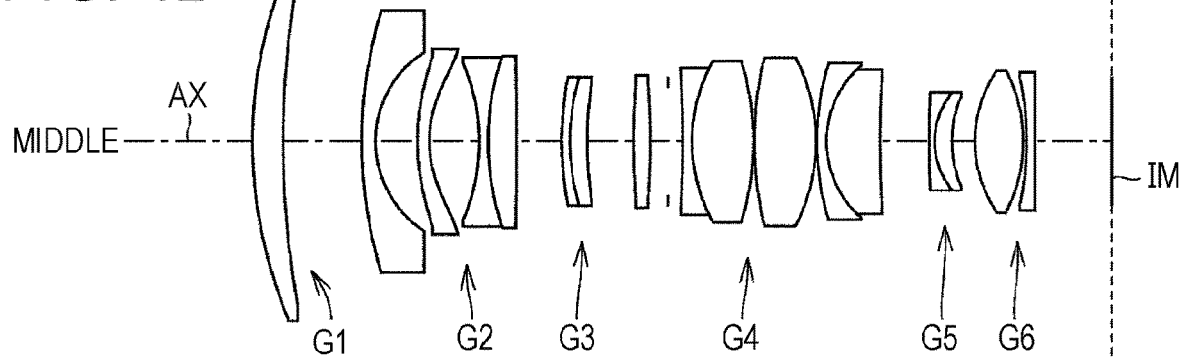
Figure 4C:
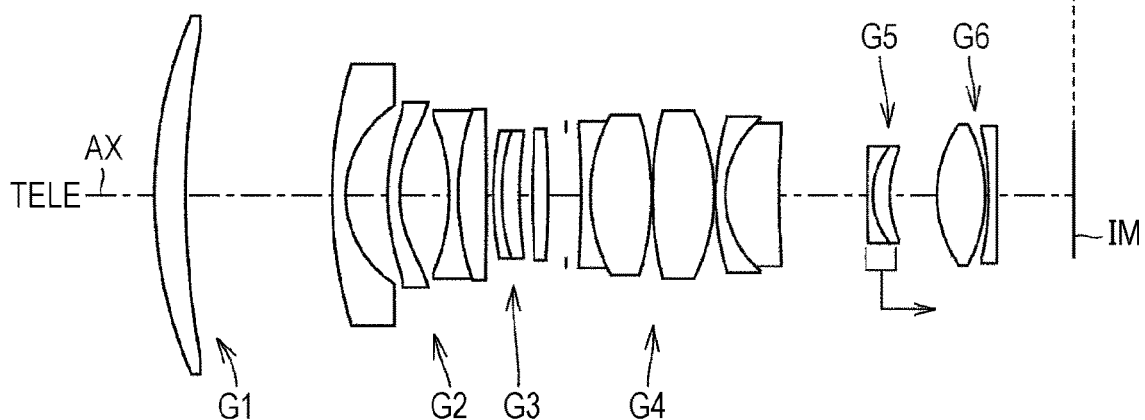

As illustrated in FIGS. 4A to 4C, the zoom lens LN according to the fourth embodiment includes, in order from the object side, a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power. During zooming, the interval between adjacent two lens groups varies among the first lens group G1, the second lens group G2, the third lens group G3, the fourth lens group G4, the fifth lens group G5, and the sixth lens group G6. The first to fifth lens groups move with the sixth lens group fixed. At the time of focusing from a far-distance object to a near-distance object, the fifth lens group G5 moves toward the image plane IM along the optical axis AX.

The first lens group G1 includes one positive lens 11. The positive lens 11 is a positive meniscus lens having a convex face facing the object side.

The second lens group G2 includes a negative meniscus lens 21 having a convex face facing the object side, a negative meniscus lens 22 having a convex face facing the object side, a biconcave negative lens 23, and a positive lens 24. The negative lens 23 and the positive lens 24 cemented together forms a cemented lens. In the fourth embodiment, the positive lens 24 is a biconvex lens.

The third lens group G3 includes a negative meniscus lens 31 having a convex face facing the object side and a positive meniscus lens 32 having a convex face facing the object side. The negative meniscus lens 31 and the positive meniscus lens 32 cemented together forms a cemented lens.

The fourth lens group G4 includes a biconvex positive lens 41, a biconcave negative lens 42, a biconvex positive lens 43, a biconvex positive lens 44, a negative meniscus lens 45 having a convex face facing the object side, and a positive lens 46. The negative lens 42 and the positive lens 43 cemented together forms a cemented lens. The negative meniscus lens 45 and the positive lens 46 cemented together forms a cemented lens. In the fourth embodiment, the positive lens 46 is a positive meniscus lens having a convex face facing the object side. An aperture stop ST is arranged between the positive lens 41 and the negative lens 42.

The fifth lens group G5 includes a negative meniscus lens 51 having a convex face facing the object side and a positive meniscus lens 52 having a convex face facing the object side. The negative meniscus lens 51 and the positive meniscus lens 52 cemented together forms a cemented lens.

The sixth lens group G6 includes a biconvex positive lens 61 and a negative lens 62. In the fourth embodiment, the negative lens 62 is a negative meniscus lens having a convex face facing the object side.

Fifth Embodiment

Figure 5A:
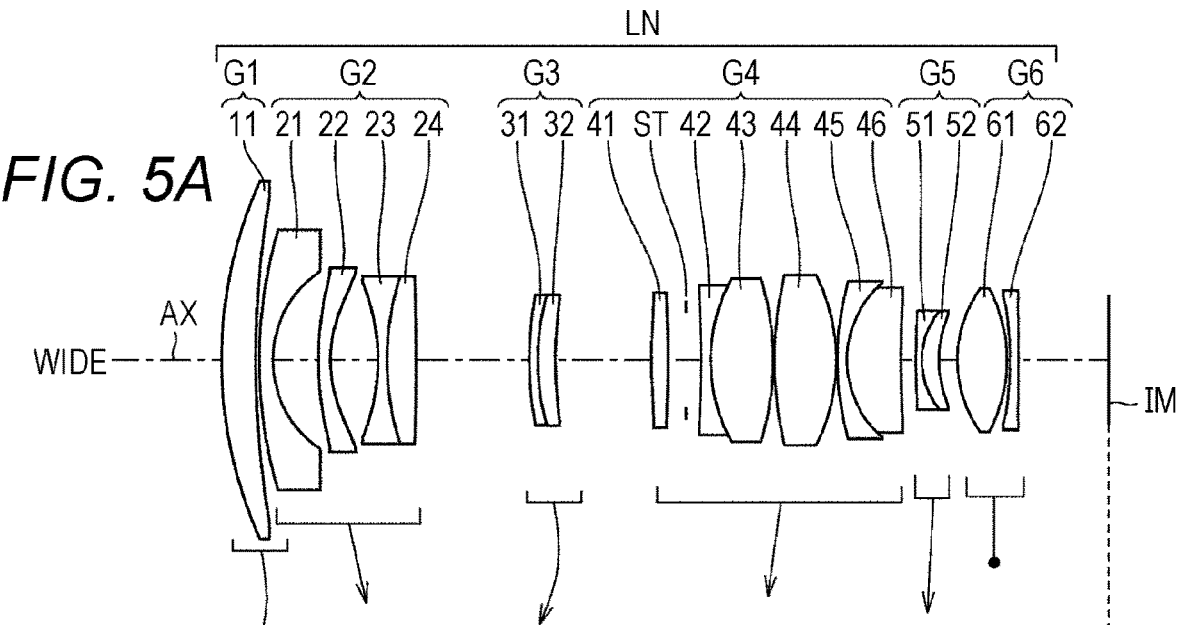
FIGS. 5A to 5C illustrate the configuration of a zoom lens according to a fifth embodiment.
Figure 5B:
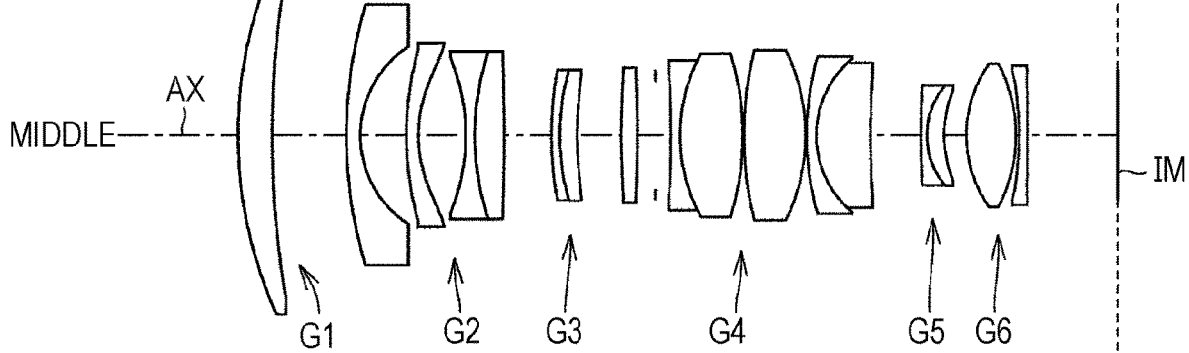
Figure 5C:
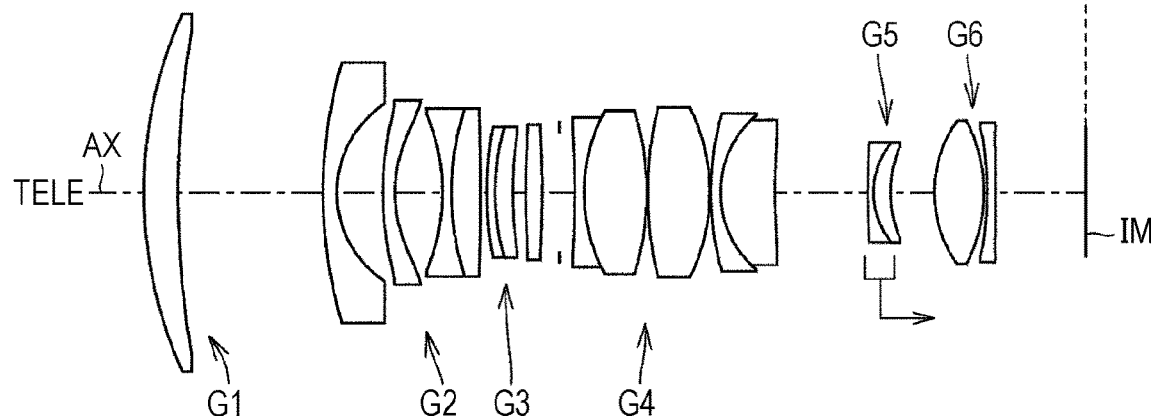

As illustrated in FIGS. 5A to 5C, the zoom lens LN according to the fifth embodiment includes, in order from the object side, a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power. During zooming, the interval between adjacent two lens groups varies among the first lens group G1, the second lens group G2, the third lens group G3, the fourth lens group G4, the fifth lens group G5, and the sixth lens group G6. The first to fifth lens groups move with the sixth lens group fixed. At the time of focusing from a far-distance object to a near-distance object, the fifth lens group G5 moves toward the image plane IM along the optical axis AX.

The first lens group G1 includes one positive lens 11. The positive lens 11 is a positive meniscus lens having a convex face facing the object side.

The second lens group G2 includes a negative meniscus lens 21 having a convex face facing the object side, a negative meniscus lens 22 having a convex face facing the object side, a biconcave negative lens 23, and a positive lens 24. The negative lens 23 and the positive lens 24 cemented together forms a cemented lens. In the fifth embodiment, the positive lens 24 is a biconvex lens.

The third lens group G3 includes a negative meniscus lens 31 having a convex face facing the object side and a positive meniscus lens 32 having a convex face facing the object side. The negative meniscus lens 31 and the positive meniscus lens 32 cemented together forms a cemented lens.

The fourth lens group G4 includes a biconvex positive lens 41, a biconcave negative lens 42, a biconvex positive lens 43, a biconvex positive lens 44, a negative meniscus lens 45 having a convex face facing the object side, and a positive lens 46. The negative lens 42 and the positive lens 43 cemented together forms a cemented lens. The negative meniscus lens 45 and the positive lens 46 cemented together forms a cemented lens. In the fifth embodiment, the positive lens 46 is a positive meniscus lens having a convex face facing the object side. An aperture stop ST is arranged between the positive lens 41 and the negative lens 42.

The fifth lens group G5 includes a negative meniscus lens 51 having a convex face facing the object side and a positive meniscus lens 52 having a convex face facing the object side. The negative meniscus lens 51 and the positive meniscus lens 52 cemented together forms a cemented lens.

The sixth lens group G6 includes a biconvex positive lens 61 and a negative lens 62. In the fifth embodiment, the negative lens 62 is a plano-concave lens having a concave on the object side.

Sixth Embodiment

Figure 6A:
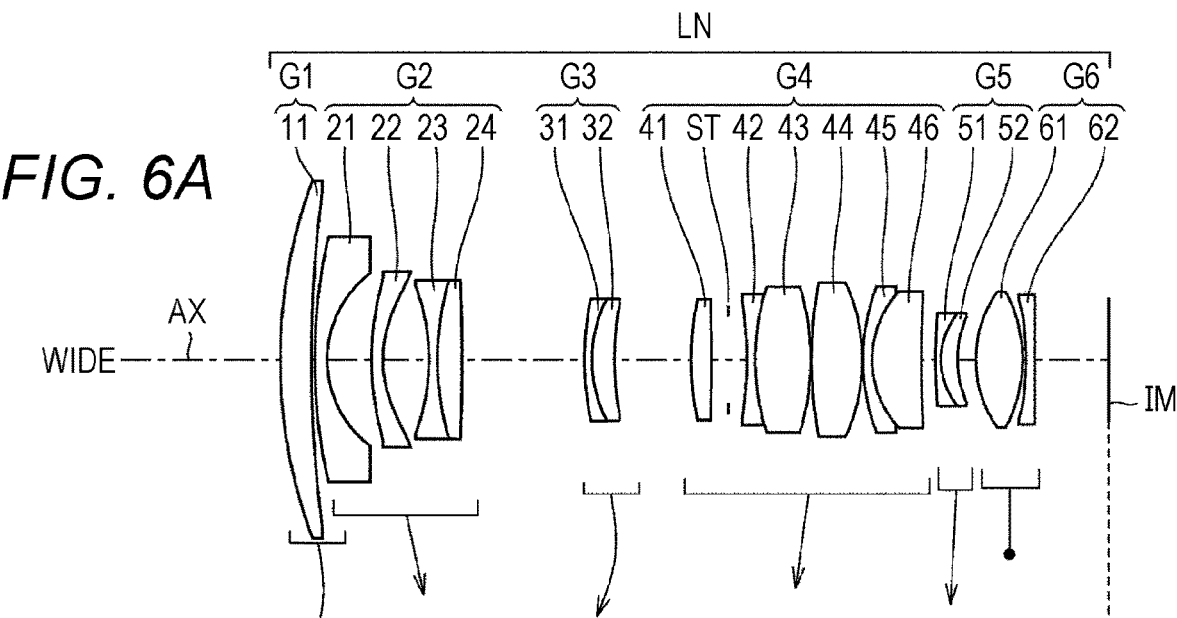
FIGS. 6A to 6C illustrate the configuration of a zoom lens according to a sixth embodiment.
Figure 6B:
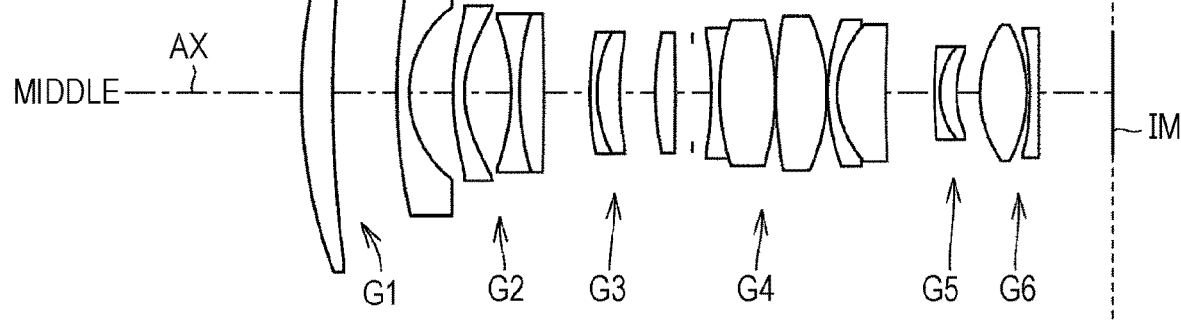
Figure 6C:
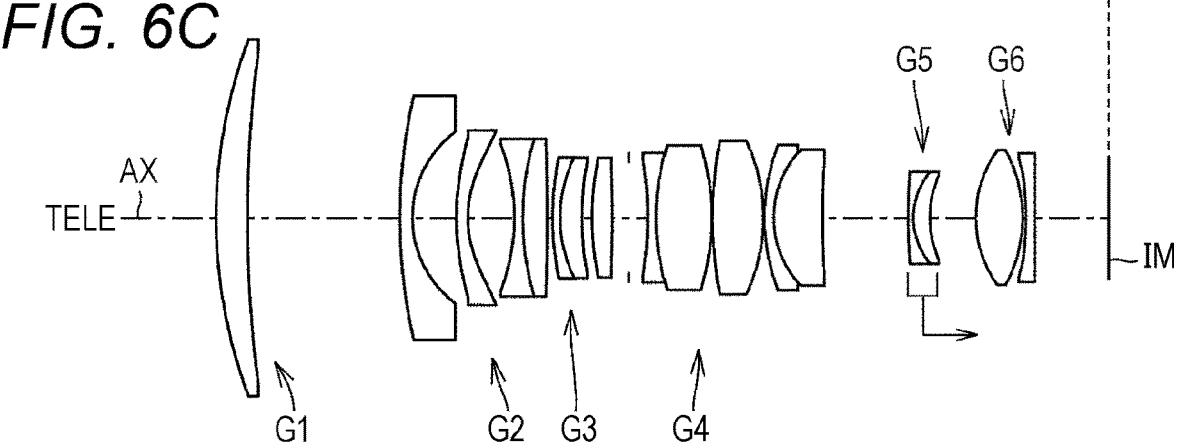

As illustrated in FIGS. 6A to 6C, the zoom lens LN according to the sixth embodiment includes, in order from the object side, a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power. During zooming, the interval between adjacent two lens groups varies among the first lens group G1, the second lens group G2, the third lens group G3, the fourth lens group G4, the fifth lens group G5, and the sixth lens group G6. The first to fifth lens groups move with the sixth lens group fixed. At the time of focusing from a far-distance object to a near-distance object, the fifth lens group G5 moves toward the image plane IM along the optical axis AX.

The first lens group G1 includes one positive lens 11. The positive lens 11 is a positive meniscus lens having a convex face facing the object side.

The second lens group G2 includes a negative meniscus lens 21 having a convex face facing the object side, a negative meniscus lens 22 having a convex face facing the object side, a biconcave negative lens 23, and a positive lens 24. The negative lens 23 and the positive lens 24 cemented together forms a cemented lens. In the sixth embodiment, the positive lens 24 is a biconvex lens.

The third lens group G3 includes a negative meniscus lens 31 having a convex face facing the object side and a positive meniscus lens 32 having a convex face facing the object side. The negative meniscus lens 31 and the positive meniscus lens 32 cemented together forms a cemented lens.

The fourth lens group G4 includes a biconvex positive lens 41, a biconcave negative lens 42, a biconvex positive lens 43, a biconvex positive lens 44, a negative meniscus lens 45 having a convex face facing the object side, and a positive lens 46. The negative lens 42 and the positive lens 43 cemented together forms a cemented lens. The negative meniscus lens 45 and the positive lens 46 cemented together forms a cemented lens. In the sixth embodiment, the positive lens 46 is a positive meniscus lens having a convex face facing the object side. An aperture stop ST is arranged between the positive lens 41 and the negative lens 42.

The fifth lens group G5 includes a negative meniscus lens 51 having a convex face facing the object side and a positive meniscus lens 52 having a convex face facing the object side. The negative meniscus lens 51 and the positive meniscus lens 52 cemented together forms a cemented lens.

The sixth lens group G6 includes a biconvex positive lens 61 and a negative lens 62. In the sixth embodiment, the negative lens 62 is a negative meniscus lens having a convex face facing the object side.

Seventh Embodiment

Figure 7A:
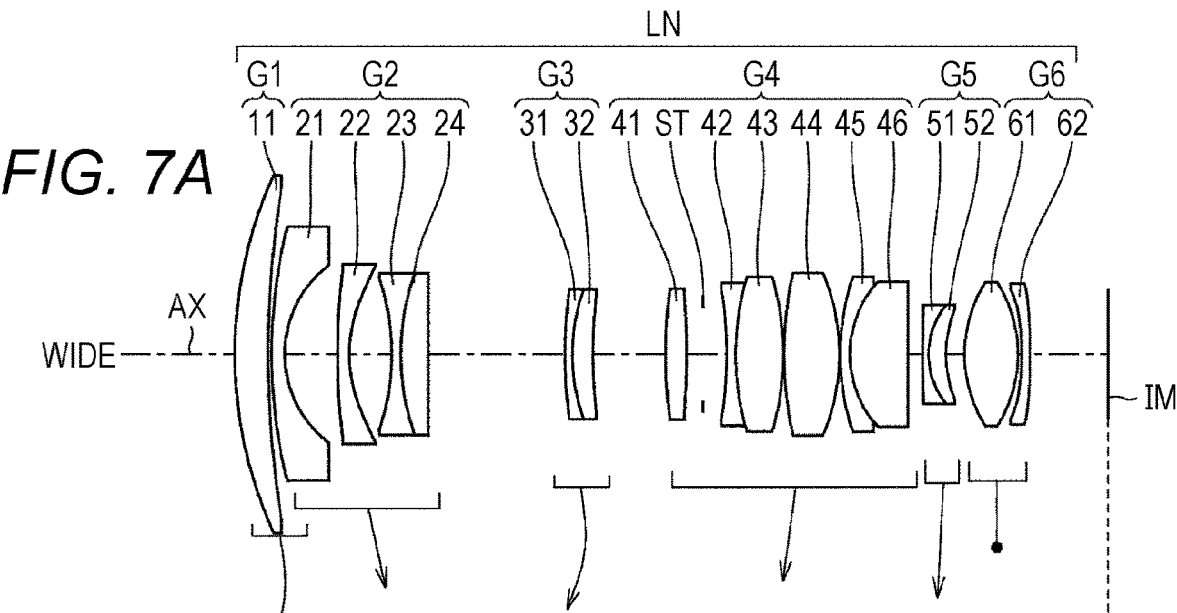
FIGS. 7A to 7C illustrate the configuration of a zoom lens according to a seventh embodiment.
Figure 7B:
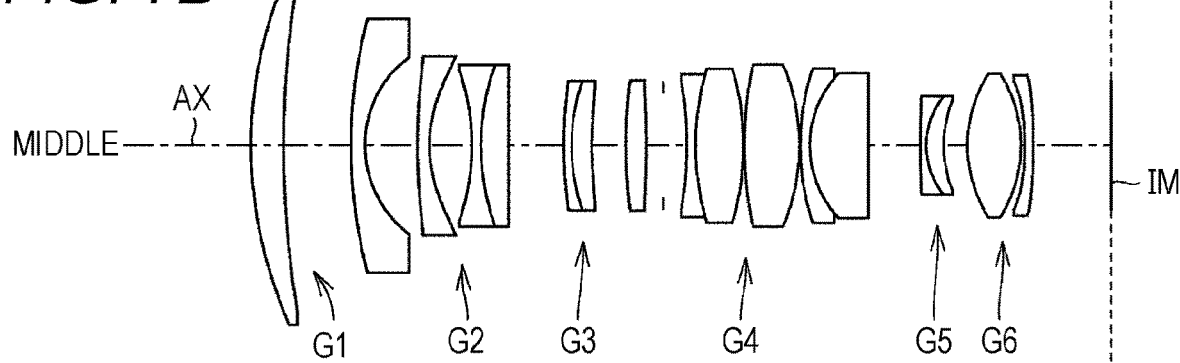
Figure 7C:
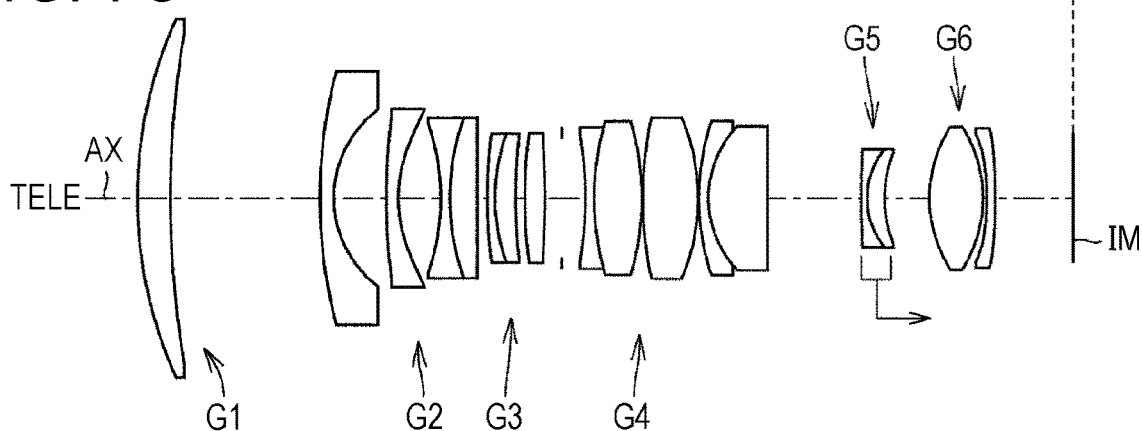

As illustrated in FIGS. 7A to 7C, the zoom lens LN according to the seventh embodiment includes, in order from the object side, a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power. During zooming, the interval between adjacent two lens groups varies among the first lens group G1, the second lens group G2, the third lens group G3, the fourth lens group G4, the fifth lens group G5, and the sixth lens group G6. The first to fifth lens groups move with the sixth lens group fixed. At the time of focusing from a far-distance object to a near-distance object, the fifth lens group G5 moves toward the image plane IM along the optical axis AX.

The first lens group G1 includes one positive lens 11. The positive lens 11 is a positive meniscus lens having a convex face facing the object side.

The second lens group G2 includes a negative meniscus lens 21 having a convex face facing the object side, a negative meniscus lens 22 having a convex face facing the object side, a biconcave negative lens 23, and a positive lens 24. The negative lens 23 and the positive lens 24 cemented together forms a cemented lens. In the seventh embodiment, the positive lens 24 is a plano-convex lens having a convex face facing the object side.

The third lens group G3 includes a negative meniscus lens 31 having a convex face facing the object side and a positive meniscus lens 32 having a convex face facing the object side. The negative meniscus lens 31 and the positive meniscus lens 32 cemented together forms a cemented lens.

The fourth lens group G4 includes a biconvex positive lens 41, a biconcave negative lens 42, a biconvex positive lens 43, a biconvex positive lens 44, a negative meniscus lens 45 having a convex face facing the object side, and a positive lens 46. The negative lens 42 and the positive lens 43 cemented together forms a cemented lens. The negative meniscus lens 45 and the positive lens 46 cemented together forms a cemented lens. In the seventh embodiment, the positive lens 46 is a plano-convex lens having a convex face facing the object side. An aperture stop ST is arranged between the positive lens 41 and the negative lens 42.

The fifth lens group G5 includes a negative meniscus lens 51 having a convex face facing the object side and a positive meniscus lens 52 having a convex face facing the object side. The negative meniscus lens 51 and the positive meniscus lens 52 cemented together forms a cemented lens.

The sixth lens group G6 includes a biconvex positive lens 61 and a negative lens 62. In the seventh embodiment, the negative lens 62 is a negative meniscus lens having a convex face facing the object side.

Eighth Embodiment

Figure 8A:
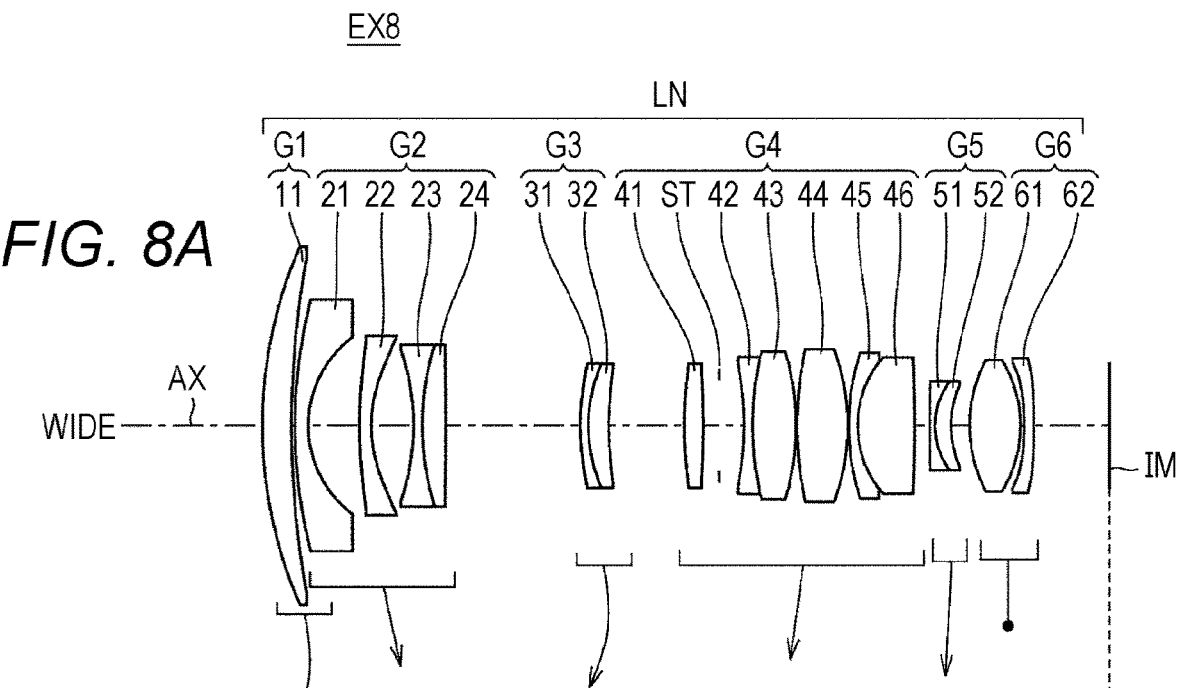
FIGS. 8A to 8C illustrate the configuration of a zoom lens according to an eighth embodiment.
Figure 8B:
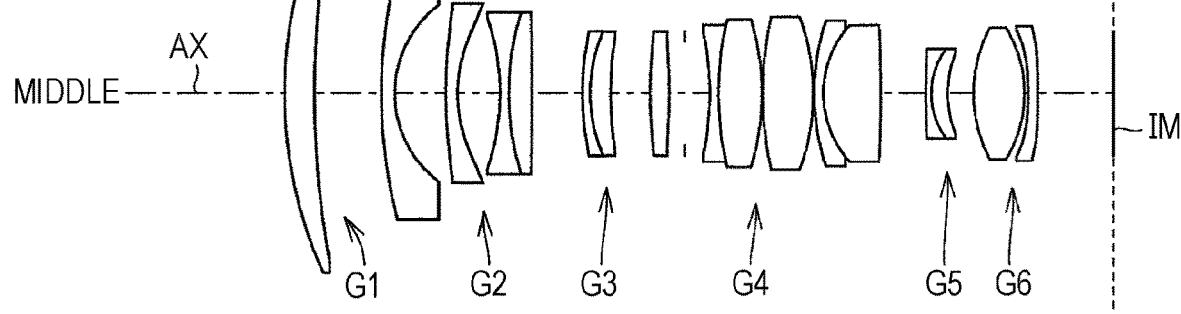
Figure 8C:
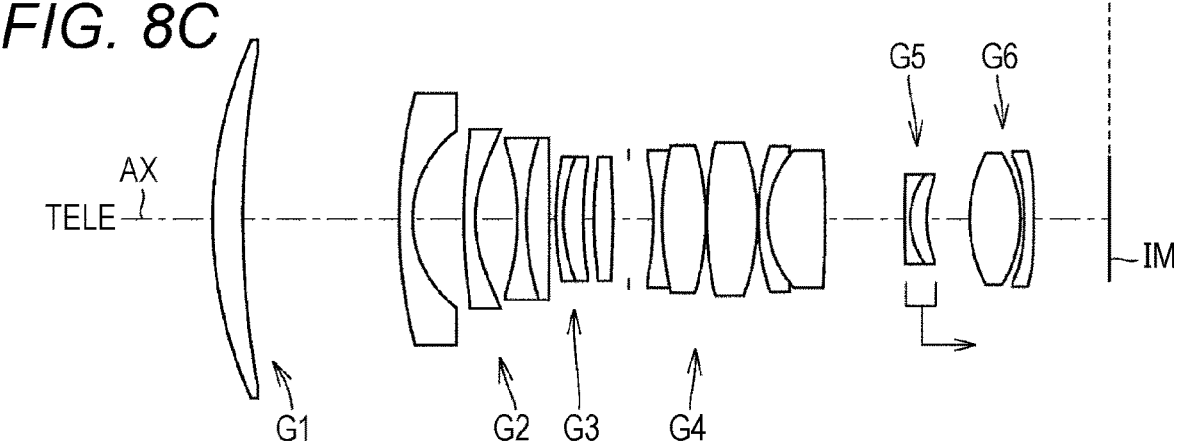
Figure 13B:
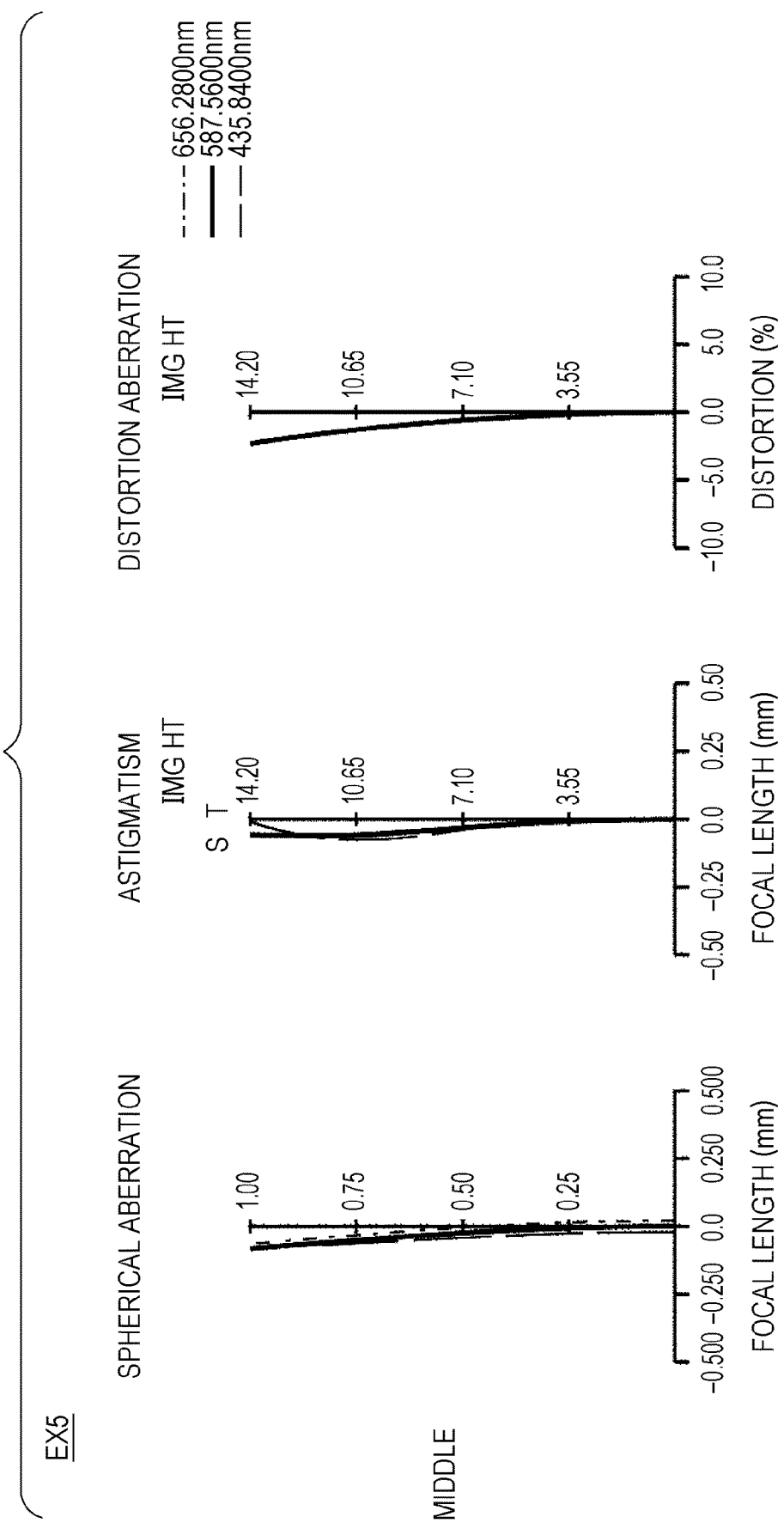
Figure 14C:
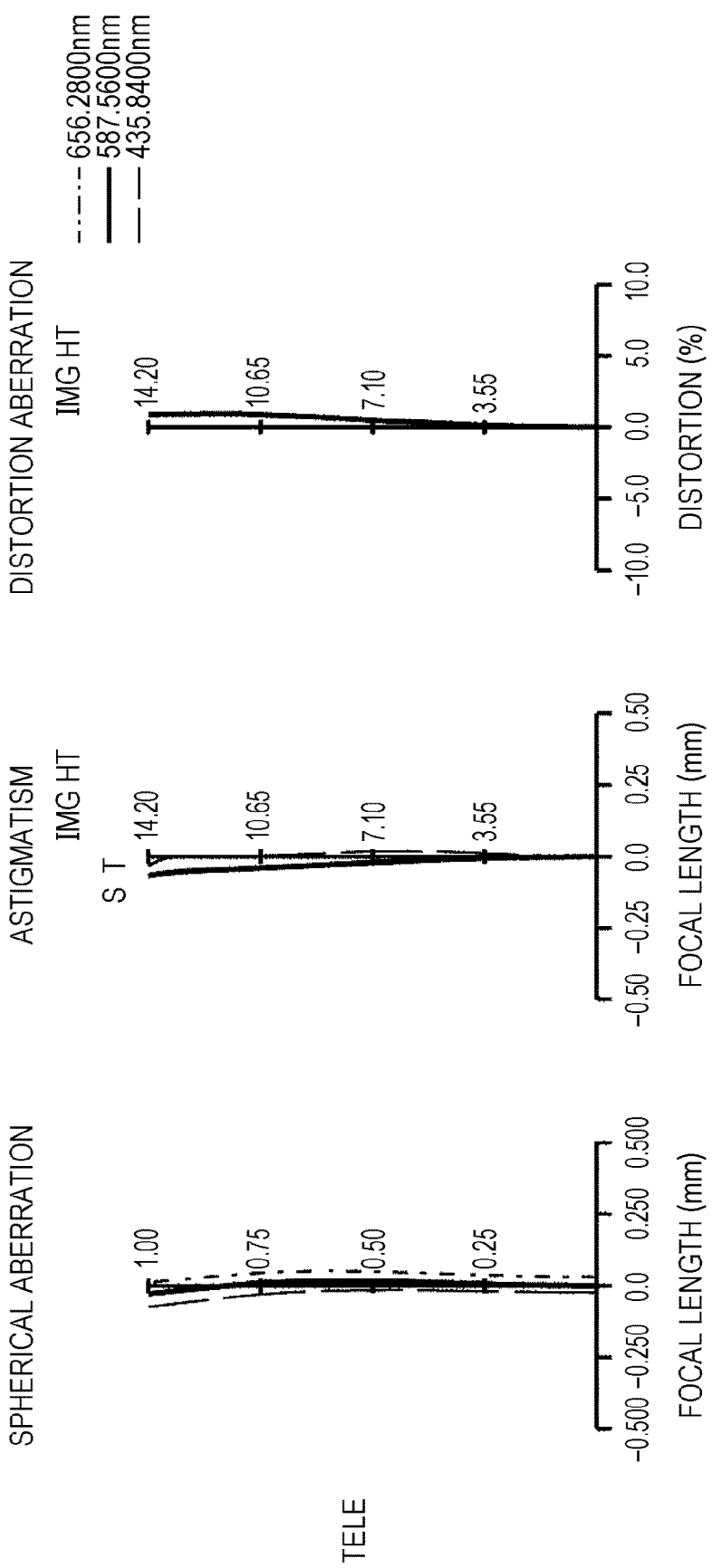
Figure 15B:
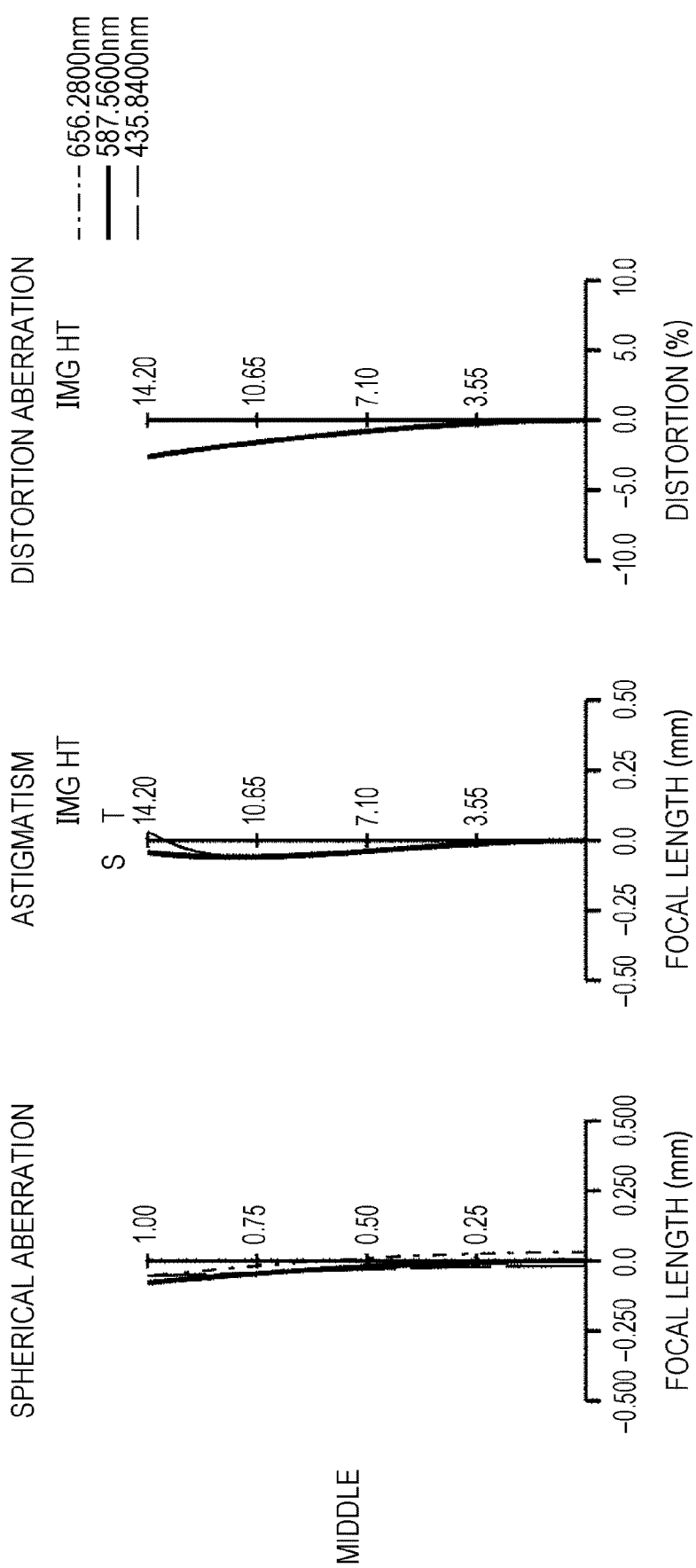

As illustrated in FIGS. 8A to 8C, the zoom lens LN according to the eighth embodiment includes, in order from the object side, a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power. During zooming, the interval between adjacent two lens groups varies among the first lens group G1, the second lens group G2, the third lens group G3, the fourth lens group G4, the fifth lens group G5, and the sixth lens group G6. The first to fifth lens groups move with the sixth lens group fixed. At the time of focusing from a far-distance object to a near-distance object, the fifth lens group G5 moves toward the image plane IM along the optical axis AX.

The first lens group G1 includes one positive lens 11. The positive lens 11 is a positive meniscus lens having a convex face facing the object side.

The second lens group G2 includes a negative meniscus lens 21 having a convex face facing the object side, a negative meniscus lens 22 having a convex face facing the object side, a biconcave negative lens 23, and a positive lens 24. The negative lens 23 and the positive lens 24 cemented together forms a cemented lens. In the eighth embodiment, the positive lens 24 is a plano-convex lens having a convex face facing the object side.

The third lens group G3 includes a negative meniscus lens 31 having a convex face facing the object side and a positive meniscus lens 32 having a convex face facing the object side. The negative meniscus lens 31 and the positive meniscus lens 32 cemented together forms a cemented lens.

The fourth lens group G4 includes a biconvex positive lens 41, a biconcave negative lens 42, a biconvex positive lens 43, a biconvex positive lens 44, a negative meniscus lens 45 having a convex face facing the object side, and a positive lens 46. The negative lens 42 and the positive lens 43 cemented together forms a cemented lens. The negative meniscus lens 45 and the positive lens 46 cemented together forms a cemented lens. In the eighth embodiment, the positive lens 46 is a biconvex lens. An aperture stop ST is arranged between the positive lens 41 and the negative lens 42.

The fifth lens group G5 includes a negative meniscus lens 51 having a convex face facing the object side and a positive meniscus lens 52 having a convex face facing the object side. The negative meniscus lens 51 and the positive meniscus lens 52 cemented together forms a cemented lens.

The sixth lens group G6 includes a biconvex positive lens 61 and a negative lens 62. In the eighth embodiment, the negative lens 62 is a negative meniscus lens having a convex face facing the object side.

EXAMPLES

The configurations of zoom lens according to embodiments of the present invention will be further specifically described below, for example, with pieces of constructive data of Examples. Examples 1 to 8 (EXs 1 to 8) given herein are numerical examples corresponding to the first to eighth embodiments described above, respectively. Thus, the lens diagrams indicating the first to eighth embodiments (FIGS. 1A to 8C) indicate the optical configurations of the corresponding Examples 1 to 8 (e.g., lens arrangements and lens shapes).

For the constructive data of each Example, as face data, provided are, in order from the left, face number # (object represents the object plane, stop represents the aperture stop, and image represents the image plane), the radius of curvature r (mm), on-axis face interval d (mm), refractive index nd for the d line (wavelength of 587.56 nm), and Abbe's number vd for the d line. A face with a face number denoted with * is an aspheric face. The shape of the face is defined by the following Expression (AS) with a local Cartesian coordinate system (x, y, z) with the vertex of the face as the origin. As aspheric data, for example, aspheric constants are provided. Note that, in the aspheric data of each Example, the constant for an absent term is zero, and the following expression is satisfied for all data:

$$e-n = \times 10^{-n}$$

$$z = (c \cdot h^2)/[1+\sqrt{1-(1+K) \cdot c^2 \cdot h^2}]+\Sigma(Aj \cdot hj) \quad \text{(AS)}$$

where h represents the height in the direction perpendicular to the z axis (optical axis AX) ($h^2 = x^2 + y^2$), z represents the sag in the direction of the optical axis AX at the height h (with respect to the vertex of the face), c represents the curvature at the vertex of the face (reciprocal of the radius of curvature r), K represents the conic constant, and Aj represents the j-order aspheric constant.

As various types of data, provided are zoom ratio (zoom ratio), and the focal length of the entire system (Fl, mm), f-number (Fno.), the half angle of view (ω, °), image height (y'max, mm), lens total length (TL, mm), backfocus (BF, mm), and variable on-axis face interval (variable: di (i represents the face number), mm), in the respective focal-length states for the wide end (wide), the intermediate focal-length state (middle), and the tele end (tele). As lens-group data, the focal length (mm) of each lens group is provided. Note that the backfocus BF is expressed by air conversion in length of the distance from the lens backmost face to the paraxial image plane. The lens total length TL is acquired by adding the backfocus BF to the distance from the lens frontmost face to the lens backmost face.

FIGS. 9A to 16C are longitudinal aberration diagrams corresponding to Examples 1 to 8 (EXs 1 to 8). In FIGS. 9A to 16C, each A illustrate aberration (spherical aberration, astigmatism, and distortion aberration) at the wide end (WIDE). Each B illustrate aberration (spherical aberration, astigmatism, and distortion aberration) in the intermediate focal-length state (MIDDLE). Each C illustrate aberration (spherical aberration, astigmatism, and distortion aberration) at the tele end (TELE).

In each spherical aberration diagram, the amount of spherical aberration for the d line (wavelength of 587.56 nm) (indicated with a solid line), the amount of spherical aberration for the C line (wavelength of 656.28 nm) (indicated with a dot-and-dash line), and the amount of spherical aberration for the g line (wavelength of 435.84 nm) (indicated with a broken line) each are expressed by the amount of deviation in focal position (unit: mm) in the direction of the optical axis AX from the paraxial image plane. The vertical axis indicates the value acquired by normalizing the incident height to the pupil by the maximum height thereof (namely, relative pupil height).

In each astigmatism diagram, broken line T indicates a tangential image plane for the d line expressed by the amount of deviation in focal position (unit: mm) in the direction of the optical axis AX from the paraxial image plane, and solid line S indicates a sagittal image plane for the d line expressed by the amount of deviation in focal position (unit: mm) in the direction of the optical axis AX from the paraxial image plane. The vertical axis indicates the image height (IMG HT, unit: mm).

In each distortion aberration diagram, the horizontal axis indicates distortion for the d line expressed by the ratio of the actual image height to the ideal image height (unit: %), and the vertical axis indicates the image height (IMG HT, unit: mm). Note that the maximum value of the image height IMG HT (namely, maximum image height y'max) corresponds to half of the diagonal length of the light-receiving face SS of an image pickup element SR (namely, diagonal image height).

Numerical Example 1

| | | Unit: mm | | |
|---|---|---|---|---|
| | | Face data | | |
| # | r | d | nd | vd |
| object | infinity | infinity | | |
| 1 | 112.035 | 9.797 | 1.51680 | 64.20 |
| 2 | 43981.585 | variable | | |
| 3 | 247.707 | 2.757 | 1.66672 | 48.32 |
| 4 | 20.973 | 10.381 | | |
| 5* | 656.496 | 2.626 | 1.58313 | 59.38 |
| 6* | 58.066 | 7.479 | | |
| 7 | −34.706 | 1.720 | 1.49700 | 81.61 |
| 8 | 131.474 | 4.834 | 2.00100 | 29.13 |
| 9 | −170.678 | variable | | |
| 10 | 81.006 | 1.720 | 1.59349 | 67.00 |
| 11 | 44.945 | 4.096 | 1.90366 | 31.31 |
| 12 | 102.747 | variable | | |
| 13* | 163.413 | 3.552 | 1.58313 | 59.38 |
| 14* | −136.726 | 4.239 | | |
| 15 (stop) | infinity | 3.422 | | |
| 16 | −196.202 | 2.101 | 1.72342 | 37.99 |
| 17 | 56.940 | 10.414 | 1.59282 | 68.62 |
| 18 | −61.456 | 0.263 | | |
| 19 | 130.807 | 11.188 | 1.49700 | 81.61 |
| 20 | −38.205 | 0.263 | | |

-continued

| | | | | |
|---|---|---|---|---|
| 21 | 64.502 | 2.101 | 1.73800 | 32.26 |
| 22 | 21.084 | 11.678 | 1.59282 | 68.62 |
| 23 | 320.002 | variable | | |
| 24 | 217.453 | 1.260 | 1.76200 | 40.10 |
| 25 | 16.433 | 4.062 | 1.84666 | 23.78 |
| 26 | 25.892 | variable | | |
| 27 | 27.994 | 10.461 | 1.49700 | 81.61 |
| 28 | −36.756 | 0.815 | | |
| 29* | −120.666 | 1.969 | 1.80860 | 40.42 |
| 30* | infinity | 19.841 | | |
| image | infinity | | | |

Aspheric data

| # | K | A4 | A6 | A8 | A10 | A12 | A14 | A16 |
|---|---|---|---|---|---|---|---|---|
| 5 | 0.0000e+000 | 3.5199e−005 | −1.1916e−007 | 3.4064e−010 | −6.6773e−013 | 4.5909e−016 | 0.0000e+000 | 0.0000e+000 |
| 6 | 0.0000e+000 | 2.9989e−005 | −1.3123e−007 | 3.6001e−010 | −8.8214e−013 | 7.2946e−016 | 0.0000e+000 | 0.0000e+000 |
| 13 | 0.0000e+000 | −5.7889e−006 | −6.6072e−009 | 2.6841e−011 | −3.4023e−014 | 0.0000e+000 | 0.0000e+000 | 0.0000e+000 |
| 14 | 0.0000e+000 | 4.3155e−006 | 2.2768e−010 | 2.3434e−011 | 0.0000e+000 | 0.0000e+000 | 0.0000e+000 | 0.0000e+000 |
| 29 | 0.0000e+000 | −3.2438e−005 | 9.3786e−008 | −7.9706e−011 | −2.0838e−013 | 0.0000e+000 | 0.0000e+000 | 0.0000e+000 |
| 30 | 0.0000e+000 | −2.4917e−005 | 1.0185e−007 | −7.8851e−011 | −1.5816e−013 | 0.0000e+000 | 0.0000e+000 | 0.0000e+000 |

Various types of data
zoom ratio 1.97

| | Wide | Middle | Tele |
|---|---|---|---|
| Fl | 16.149 | 22.712 | 31.839 |
| Fno. | 2.000 | 2.000 | 2.000 |
| ω | 41.326 | 32.014 | 24.036 |
| y'max | 14.200 | 14.200 | 14.200 |
| TL | 191.408 | 193.151 | 203.700 |
| BF | 37.853 | 37.853 | 37.853 |
| d2 | 0.788 | 12.535 | 24.970 |
| d9 | 10.743 | 5.003 | 1.313 |
| d12 | 21.517 | 10.404 | 2.709 |
| d23 | 3.282 | 8.967 | 15.214 |
| d26 | 5.996 | 7.160 | 10.411 |

Lens-group data

| Group (faces) | Fl |
|---|---|
| 1 (1-2) | 217.325 |
| 2 (3-9) | −21.113 |
| 3 (10-12) | 174.955 |
| 4 (13-23) | 35.956 |
| 5 (24-26) | −42.820 |
| 6 (27-30) | 41.859 |

Numerical Example 2

Unit: mm
Face data

| # | r | d | nd | vd |
|---|---|---|---|---|
| object | infinity | infinity | | |
| 1 | 97.798 | 7.446 | 1.62299 | 58.12 |
| 2 | 239.554 | variable | | |
| 3 | 111.538 | 3.020 | 1.83400 | 37.16 |
| 4 | 24.388 | 12.132 | | |
| 5* | 350.236 | 2.626 | 1.58313 | 59.46 |
| 6* | 32.444 | 8.393 | | |
| 7 | −57.405 | 1.983 | 1.49700 | 81.61 |
| 8 | 54.472 | 5.992 | 2.00100 | 29.13 |
| 9 | infinity | variable | | |
| 10 | 126.889 | 1.720 | 1.48749 | 70.44 |
| 11 | 41.720 | 4.614 | 1.80100 | 34.97 |
| 12 | 131.111 | variable | | |
| 13* | 93.219 | 4.497 | 1.58313 | 59.46 |
| 14* | −182.072 | 3.738 | | |
| 15 (stop) | infinity | 5.289 | | |
| 16 | −81.847 | 1.969 | 1.72047 | 34.71 |

-continued

| # | r | d | nd | vd |
|---|---|---|---|---|
| 17 | 73.954 | 10.137 | 1.48749 | 70.44 |
| 18 | −56.054 | 0.197 | | |
| 19 | 73.077 | 11.771 | 1.49700 | 81.61 |
| 20 | −52.330 | 0.197 | | |
| 21 | 60.046 | 2.102 | 1.80100 | 34.97 |
| 22 | 23.481 | 13.469 | 1.59282 | 68.62 |
| 23 | −282.247 | variable | | |
| 24 | 319.332 | 1.221 | 1.76200 | 40.10 |
| 25 | 17.124 | 3.913 | 1.80518 | 25.46 |
| 26 | 27.020 | variable | | |
| 27 | 29.938 | 11.743 | 1.49700 | 81.61 |
| 28 | −29.938 | 0.760 | | |
| 29* | −96.289 | 1.838 | 1.80610 | 40.73 |
| 30* | −1312.991 | 19.850 | | |
| image | infinity | | | |

Aspheric data

| # | K | A4 | A6 | A8 | A10 | A12 | A14 | A16 |
|---|---|---|---|---|---|---|---|---|
| 5 | 0.0000e+000 | 6.4219e−006 | −3.5838e−008 | 1.0623e−010 | −1.9974e−013 | 1.5034e−016 | 0.0000e+000 | 0.0000e+000 |
| 6 | 0.0000e+000 | 8.2647e−008 | −4.9705e−008 | 1.5339e−010 | −3.6618e−013 | 3.4720e−016 | 0.0000e+000 | 0.0000e+000 |
| 13 | 0.0000e+000 | −2.5035e−006 | −2.4245e−009 | 2.0117e−012 | −4.2546e−015 | 0.0000e+000 | 0.0000e+000 | 0.0000e+000 |
| 14 | 0.0000e+000 | 3.8466e−006 | −6.5759e−010 | 2.0793e−012 | 0.0000e+000 | 0.0000e+000 | 0.0000e+000 | 0.0000e+000 |
| 29 | 0.0000e+000 | −4.2929e−005 | 6.4523e−008 | 1.4232e−010 | −8.5105e−013 | 0.0000e+000 | 0.0000e+000 | 0.0000e+000 |
| 30 | 0.0000e+000 | −3.3180e−005 | 8.5486e−008 | 5.0997e−011 | −5.6758e−013 | 0.0000e+000 | 0.0000e+000 | 0.0000e+000 |

Various types of data
zoom ratio 2.35

| | Wide | Middle | Tele |
|---|---|---|---|
| Fl | 13.523 | 20.744 | 31.838 |
| Fno. | 2.200 | 2.200 | 2.200 |
| ω | 46.400 | 34.394 | 24.037 |
| y'max | 14.200 | 14.200 | 14.200 |
| TL | 195.068 | 191.713 | 208.161 |
| BF | 19.850 | 19.850 | 19.850 |
| d2 | 0.788 | 14.607 | 33.051 |
| d9 | 29.159 | 11.896 | 2.317 |
| d12 | 17.106 | 7.955 | 1.987 |
| d23 | 3.282 | 11.076 | 19.675 |
| d26 | 4.117 | 5.563 | 10.515 |

Lens-group data

| Group (faces) | Fl |
|---|---|
| 1 (1-2) | 260.041 |
| 2 (3-9) | −21.502 |
| 3 (10-12) | 184.564 |
| 4 (13-23) | 39.379 |
| 5 (24-26) | −40.767 |
| 6 (27-30) | 40.882 |

Numerical Example 3

Unit: mm

| # | r | d | nd | vd |
|---|---|---|---|---|
| object | infinity | infinity | | |
| 1 | 114.380 | 6.500 | 1.71700 | 47.98 |
| 2 | 227.770 | variable | | |
| 3 | 117.378 | 3.151 | 1.83400 | 37.34 |
| 4 | 24.995 | 9.517 | | |
| 5* | 58.067 | 2.626 | 1.58313 | 59.38 |
| 6* | 26.223 | 11.955 | | |
| 7 | −50.973 | 1.983 | 1.49700 | 81.61 |
| 8 | 52.019 | 6.659 | 2.00100 | 29.13 |
| 9 | 1282.529 | variable | | |
| 10 | 57.845 | 2.232 | 1.59349 | 67.00 |
| 11 | 48.205 | 3.863 | 1.84666 | 23.78 |
| 12 | 74.404 | variable | | |
| 13* | 158.330 | 3.643 | 1.58313 | 59.38 |

-continued

| # | r | d | nd | vd |
|---|---|---|---|---|
| 14* | −160.994 | 4.010 | | |
| 15 (stop) | infinity | 3.638 | | |
| 16 | −174.892 | 2.101 | 1.72047 | 34.71 |
| 17 | 48.612 | 11.265 | 1.59282 | 68.62 |
| 18 | −77.512 | 0.263 | | |
| 19 | 107.992 | 12.342 | 1.49700 | 81.61 |
| 20 | −41.323 | 0.263 | | |
| 21 | 59.773 | 2.101 | 1.80610 | 33.27 |
| 22 | 23.768 | 12.103 | 1.59282 | 68.62 |
| 23 | 800.730 | variable | | |
| 24 | 204.641 | 1.260 | 1.76200 | 40.10 |
| 25 | 17.181 | 3.866 | 1.84666 | 23.78 |
| 26 | 26.153 | variable | | |
| 27 | 28.250 | 10.584 | 1.49700 | 81.61 |
| 28 | −35.218 | 0.688 | | |
| 29* | −103.890 | 1.838 | 1.80860 | 40.42 |
| 30* | infinity | 19.847 | | |
| image | infinity | | | |

Aspheric data

| # | K | A4 | A6 | A8 | A10 | A12 | A14 | A16 |
|---|---|---|---|---|---|---|---|---|
| 5 | 0.0000e+000 | 7.4972e−006 | −3.0177e−008 | 3.7983e−011 | 4.3914e−015 | −5.7241e−017 | 0.0000e+000 | 0.0000e+000 |
| 6 | 0.0000e+000 | −5.0236e−007 | −4.4365e−008 | 2.2291e−011 | 5.2462e−014 | −1.5899e−016 | 0.0000e+000 | 0.0000e+000 |
| 13 | 0.0000e+000 | −5.6908e−006 | −8.9796e−009 | 2.7547e−011 | −8.3343e−015 | 0.0000e+000 | 0.0000e+000 | 0.0000e+000 |
| 14 | 0.0000e+000 | 2.4077e−006 | −5.0212e−009 | 2.9044e−011 | 0.0000e+000 | 0.0000e+000 | 0.0000e+000 | 0.0000e+000 |
| 29 | 0.0000e+000 | −1.4146e−005 | 3.3607e−008 | −1.0652e−010 | −2.4324e−014 | 0.0000e+000 | 0.0000e+000 | 0.0000e+000 |
| 30 | 0.0000e+000 | −3.8458e−006 | 3.8480e−008 | −9.6114e−011 | −6.8648e−016 | 0.0000e+000 | 0.0000e+000 | 0.0000e+000 | zoom ratio 2.35

| | Wide | Middle | Tele |
|---|---|---|---|
| Fl | 13.523 | 20.742 | 31.840 |
| Fno. | 2.200 | 2.200 | 2.200 |
| ω | 46.399 | 34.395 | 24.036 |
| y'max | 14.200 | 14.200 | 14.200 |
| TL | 211.113 | 208.963 | 223.025 |
| BF | 37.733 | 37.733 | 37.733 |
| d2 | 0.788 | 17.070 | 33.350 |
| d9 | 31.287 | 12.755 | 1.313 |
| d12 | 17.249 | 8.612 | 3.459 |
| d23 | 3.282 | 10.779 | 19.666 |
| d26 | 4.164 | 5.403 | 10.892 |

Lens-group data

| Group (faces) | Fl |
|---|---|
| 1 (1-2) | 312.954 |
| 2 (3-9) | −23.648 |
| 3 (10-12) | 217.947 |
| 4 (13-23) | 38.805 |
| 5 (24-26) | −43.358 |
| 6 (27-30) | 42.928 |

Numerical Example 4

Unit: mm

| # | r | d | nd | vd |
|---|---|---|---|---|
| object | infinity | infinity | | |
| 1 | 102.800 | 6.912 | 1.74330 | 49.22 |
| 2 | 206.015 | variable | | |
| 3 | 102.837 | 3.020 | 1.91082 | 35.25 |
| 4 | 24.039 | 9.368 | | |
| 5* | 53.438 | 2.626 | 1.58313 | 59.38 |
| 6* | 25.990 | 11.076 | | |
| 7 | −45.752 | 1.983 | 1.49700 | 81.61 |
| 8 | 59.851 | 6.314 | 2.00100 | 29.13 |
| 9 | −1250.354 | variable | | |
| 10 | 76.209 | 1.851 | 1.48749 | 70.44 |
| 11 | 48.642 | 3.952 | 1.84666 | 23.78 |

-continued

| # | r | d | nd | vd |
|---|---|---|---|---|
| 12 | 91.135 | variable | | |
| 13* | 157.123 | 3.572 | 1.58313 | 59.38 |
| 14* | -176.090 | 3.967 | | |
| 15 (stop) | infinity | 3.393 | | |
| 16 | -228.783 | 2.101 | 1.76200 | 40.10 |
| 17 | 38.136 | 13.571 | 1.59282 | 68.62 |
| 18 | -62.276 | 0.263 | | |
| 19 | 82.297 | 13.672 | 1.49700 | 81.61 |
| 20 | -42.036 | 0.263 | | |
| 21 | 61.998 | 2.101 | 1.80610 | 33.27 |
| 22 | 22.748 | 12.065 | 1.59282 | 68.62 |
| 23 | 235.084 | variable | | |
| 24 | 181.236 | 1.260 | 1.76200 | 40.10 |
| 25 | 17.349 | 3.832 | 1.84666 | 23.78 |
| 26 | 26.272 | variable | | |
| 27 | 28.201 | 10.783 | 1.49700 | 81.61 |
| 28 | -34.501 | 0.692 | | |
| 29* | -94.394 | 1.838 | 1.80860 | 40.42 |
| 30* | -3865.509 | 19.851 | | |
| image | infinity | | | |

Aspheric data

| # | K | A4 | A6 | A8 | A10 | A12 | A14 | A16 |
|---|---|---|---|---|---|---|---|---|
| 5 | 0.0000e+000 | 5.0573e-006 | -4.0151e-008 | 1.1889e-010 | -2.0064e-013 | 1.0081e-016 | 0.0000e+000 | 0.0000e+000 |
| 6 | 0.0000e+000 | -4.3685e-006 | -6.3430e-008 | 1.6916e-010 | -3.7142e-013 | 2.3792e-016 | 0.0000e+000 | 0.0000e+000 |
| 13 | 0.0000e+000 | -5.5264e-006 | -8.9029e-009 | 2.5309e-011 | -6.7619e-015 | 0.0000e+000 | 0.0000e+000 | 0.0000e+000 |
| 14 | 0.0000e+000 | 2.6556e-006 | -5.1768e-009 | 2.7037e-011 | 0.0000e+000 | 0.0000e+000 | 0.0000e+000 | 0.0000e+000 |
| 29 | 0.0000e+000 | -8.1540e-006 | -3.3874e-008 | 1.7956e-010 | -5.0260e-013 | 0.0000e+000 | 0.0000e+000 | 0.0000e+000 |
| 30 | 0.0000e+000 | 2.8799e-006 | -3.3871e-008 | 2.0673e-010 | -5.0303e-013 | 0.0000e+000 | 0.0000e+000 | 0.0000e+000 |

Various types of data
zoom ratio 2.35

| | Wide | Middle | Tele |
|---|---|---|---|
| Fl | 13.523 | 20.742 | 31.840 |
| Fno. | 2.200 | 2.200 | 2.200 |
| ω | 46.399 | 34.395 | 24.036 |
| y'max | 14.200 | 14.200 | 14.200 |
| TL | 195.069 | 194.313 | 207.662 |
| BF | 19.851 | 19.851 | 19.851 |
| d2 | 0.788 | 17.533 | 32.715 |
| d9 | 23.853 | 10.140 | 1.486 |
| d12 | 22.612 | 10.389 | 3.023 |
| d23 | 3.282 | 10.771 | 19.647 |
| d26 | 4.211 | 5.156 | 10.467 |

Lens-group data

| Group (faces) | Fl |
|---|---|
| 1 (1-2) | 268.386 |
| 2 (3-9) | -21.979 |
| 3 (10-12) | 209.264 |
| 4 (13-23) | 38.931 |
| 5 (24-26) | -44.535 |
| 6 (27-30) | 43.339 |

Numerical Example 5

Unit: mm

| # | r | d | nd | vd |
|---|---|---|---|---|
| object | infinity | infinity | | |
| 1 | 97.661 | 7.474 | 1.65844 | 50.85 |
| 2 | 216.264 | variable | | |
| 3 | 103.052 | 3.020 | 1.91082 | 35.25 |
| 4 | 23.682 | 10.138 | | |
| 5* | 81.876 | 2.626 | 1.58313 | 59.38 |
| 6* | 29.732 | 10.395 | | |
| 7 | -45.520 | 1.983 | 1.49700 | 81.61 |
| 8 | 60.836 | 6.396 | 2.00100 | 29.13 |

-continued

| # | r | d | nd | vd |
|---|---|---|---|---|
| 9 | −533.026 | variable | | |
| 10 | 76.916 | 1.851 | 1.48749 | 70.44 |
| 11 | 52.134 | 3.920 | 1.84666 | 23.78 |
| 12 | 99.241 | variable | | |
| 13* | 142.657 | 3.600 | 1.58313 | 59.38 |
| 14* | −199.337 | 3.939 | | |
| 15 (stop) | infinity | 3.290 | | |
| 16 | −270.726 | 2.101 | 1.76200 | 40.10 |
| 17 | 38.165 | 13.730 | 1.59282 | 68.62 |
| 18 | −61.732 | 0.263 | | |
| 19 | 80.155 | 13.545 | 1.49700 | 81.61 |
| 20 | −42.906 | 0.263 | | |
| 21 | 64.916 | 2.101 | 1.80610 | 33.27 |
| 22 | 22.495 | 11.998 | 1.59282 | 68.62 |
| 23 | 224.702 | variable | | |
| 24 | 227.061 | 1.260 | 1.76200 | 40.10 |
| 25 | 17.380 | 3.792 | 1.84666 | 23.78 |
| 26 | 26.633 | variable | | |
| 27 | 27.802 | 10.871 | 1.49700 | 81.61 |
| 28 | −34.411 | 0.669 | | |
| 29* | −103.935 | 1.838 | 1.80860 | 40.42 |
| 30* | infinity | 19.851 | | |
| image | infinity | | | |

Aspheric data

| # | K | A4 | A6 | A8 | A10 | A12 | A14 | A16 |
|---|---|---|---|---|---|---|---|---|
| 5 | 0.0000e+000 | 1.1671e−005 | −6.0195e−008 | 1.7505e−010 | −3.0259e−013 | 1.8490e−016 | 0.0000e+000 | 0.0000e+000 |
| 6 | 0.0000e+000 | 4.1973e−006 | −8.1751e−008 | 2.3628e−010 | −5.1144e−013 | 3.9485e−016 | 0.0000e+000 | 0.0000e+000 |
| 13 | 0.0000e+000 | −5.0290e−006 | −7.3270e−009 | 1.6227e−011 | −8.3007e−015 | 0.0000e+000 | 0.0000e+000 | 0.0000e+000 |
| 14 | 0.0000e+000 | 2.9050e−006 | −3.6769e−009 | 1.6458e−011 | 0.0000e+000 | 0.0000e+000 | 0.0000e+000 | 0.0000e+000 |
| 29 | 0.0000e+000 | −1.4930e−005 | 1.6288e−008 | 2.2616e−011 | −2.9820e−013 | 0.0000e+000 | 0.0000e+000 | 0.0000e+000 |
| 30 | 0.0000e+000 | −4.2085e−006 | 2.2644e−008 | 3.2079e−011 | −2.5433e−013 | 0.0000e+000 | 0.0000e+000 | 0.0000e+000 |

Various types of data

| | Wide | Middle | Tele |
|---|---|---|---|
| Fl | 13.523 | 20.742 | 31.840 |
| Fno. | 2.200 | 2.200 | 2.200 |
| w | 46.399 | 34.395 | 24.036 |
| y max | 14.200 | 14.200 | 14.200 |
| TL | 211.120 | 209.537 | 223.064 |
| BF | 37.740 | 37.740 | 37.740 |
| d2 | 0.788 | 16.549 | 31.932 |
| d9 | 24.836 | 10.385 | 1.313 |
| d12 | 21.211 | 9.696 | 2.843 |
| d23 | 3.321 | 11.112 | 20.463 |
| d26 | 4.001 | 4.831 | 9.549 |

Lens-group data

| Group (faces) | Fl |
|---|---|
| 1 (1-2) | 263.856 |
| 2 (3-9) | −21.782 |
| 3 (10-12) | 202.121 |
| 4 (13-23) | 39.376 |
| 5 (24-26) | −43.550 |
| 6 (27-30) | 41.959 |

Numerical Example 6

Unit: mm

| # | r | d | nd | vd |
|---|---|---|---|---|
| object | infinity | infinity | | |
| 1 | 120.349 | 7.245 | 1.65844 | 50.85 |
| 2 | 304.573 | variable | | |
| 3 | 130.126 | 2.889 | 1.83400 | 37.16 |
| 4 | 25.497 | 10.246 | | |
| 5* | 68.724 | 2.626 | 1.58313 | 59.38 |
| 6* | 27.120 | 10.723 | | |

-continued

| # | r | d | nd | vd |
|---|---|---|---|---|
| 7 | −48.807 | 1.983 | 1.49700 | 81.61 |
| 8 | 65.917 | 5.653 | 2.00100 | 29.13 |
| 9 | −558.712 | variable | | |
| 10 | 71.205 | 1.720 | 1.59349 | 67.00 |
| 11 | 31.300 | 5.199 | 1.80610 | 33.27 |
| 12 | 70.544 | variable | | |
| 13* | 62.104 | 4.709 | 1.58313 | 59.38 |
| 14* | −278.076 | 3.837 | | |
| 15 (stop) | infinity | 4.328 | | |
| 16 | −91.521 | 1.969 | 1.91082 | 35.25 |
| 17 | 55.705 | 12.840 | 1.59282 | 68.62 |
| 18 | −59.969 | 0.263 | | |
| 19 | 100.302 | 11.772 | 1.49700 | 81.61 |
| 20 | −42.615 | 0.263 | | |
| 21 | 48.372 | 2.101 | 1.80610 | 33.27 |
| 22 | 23.552 | 11.412 | 1.59282 | 68.62 |
| 23 | 277.374 | variable | | |
| 24 | 122.542 | 1.260 | 1.76200 | 40.10 |
| 25 | 17.097 | 3.819 | 1.84666 | 23.78 |
| 26 | 24.864 | variable | | |
| 27 | 27.555 | 10.868 | 1.49700 | 81.61 |
| 28 | −33.889 | 0.803 | | |
| 29* | −79.129 | 2.101 | 1.80860 | 40.42 |
| 30* | −6330.530 | 19.850 | | |
| image | infinity | | | |

Aspheric data

| # | K | A4 | A6 | A8 | A10 | A12 | A14 | A16 |
|---|---|---|---|---|---|---|---|---|
| 5 | 0.0000e+000 | 6.7221e−006 | −4.9739e−008 | 1.6717e−010 | −3.0099e−013 | 1.9512e−016 | 0.0000e+000 | 0.0000e+000 |
| 6 | 0.0000e+000 | −1.5350e−006 | −7.1845e−008 | 2.3071e−010 | −4.9018e−013 | 3.4970e−016 | 0.0000e+000 | 0.0000e+000 |
| 13 | 0.0000e+000 | −2.1289e−006 | −7.4781e−009 | −9.7300e−012 | −1.0329e−014 | 0.0000e+000 | 0.0000e+000 | 0.0000e+000 |
| 14 | 0.0000e+000 | 5.5325e−006 | −4.2433e−009 | −1.1445e−011 | 0.0000e+000 | 0.0000e+000 | 0.0000e+000 | 0.0000e+000 |
| 29 | 0.0000e+000 | −8.4066e−006 | −3.7917e−008 | 2.1620e−010 | −5.7588e−013 | 0.0000e+000 | 0.0000e+000 | 0.0000e+000 |
| 30 | 0.0000e+000 | 2.5904e−006 | −3.7773e−008 | 2.4271e−010 | −5.6888e−013 | 0.0000e+000 | 0.0000e+000 | 0.0000e+000 |

Various types of data
zoom ratio 2.35

| | Wide | Middle | Tele |
|---|---|---|---|
| Fl | 13.523 | 20.742 | 31.841 |
| Fno. | 2.200 | 2.200 | 2.200 |
| ω | 46.399 | 34.396 | 24.035 |
| y'max | 14.200 | 14.200 | 14.200 |
| TL | 195.069 | 191.036 | 210.035 |
| BF | 19.850 | 19.850 | 19.850 |
| d2 | 0.788 | 14.699 | 35.498 |
| d9 | 28.546 | 10.865 | 1.313 |
| d12 | 17.745 | 8.268 | 2.231 |
| d23 | 3.282 | 11.336 | 19.931 |
| d26 | 4.229 | 5.389 | 10.582 |

Lens-group data

| Group (faces) | Fl |
|---|---|
| 1 (1-2) | 297.542 |
| 2 (3-9) | −23.164 |
| 3 (10-12) | 235.962 |
| 4 (13-23) | 39.069 |
| 5 (24-26) | −45.523 |
| 6 (27-30) | 44.927 |

Numerical Example 7

Unit: mm

| # | r | d | nd | vd |
|---|---|---|---|---|
| object | infinity | infinity | | |
| 1 | 97.013 | 7.289 | 1.62299 | 58.12 |
| 2 | 224.099 | variable | | |
| 3 | 112.669 | 3.020 | 1.83400 | 37.16 |
| 4 | 24.730 | 11.606 | | |

-continued

| # | r | d | nd | vd |
|---|---|---|---|---|
| 5* | 224.633 | 2.626 | 1.58270 | 59.34 |
| 6* | 31.880 | 9.311 | | |
| 7 | −51.655 | 1.983 | 1.49700 | 81.61 |
| 8 | 53.348 | 6.079 | 2.00100 | 29.13 |
| 9 | infinity | variable | | |
| 10 | 110.989 | 1.720 | 1.48749 | 70.44 |
| 11 | 42.777 | 4.565 | 1.80100 | 34.97 |
| 12 | 129.407 | variable | | |
| 13* | 92.909 | 4.571 | 1.58313 | 59.46 |
| 14* | −168.064 | 3.661 | | |
| 15 (stop) | infinity | 5.208 | | |
| 16 | −86.100 | 1.969 | 1.72047 | 34.71 |
| 17 | 60.978 | 10.476 | 1.48749 | 70.44 |
| 18 | −60.978 | 0.197 | | |
| 19 | 84.935 | 12.129 | 1.49700 | 81.61 |
| 20 | −46.469 | 0.197 | | |
| 21 | 54.811 | 2.101 | 1.80100 | 34.97 |
| 22 | 23.483 | 12.920 | 1.59282 | 68.62 |
| 23 | infinity | variable | | |
| 24 | 259.112 | 1.260 | 1.76200 | 40.10 |
| 25 | 17.512 | 3.836 | 1.80518 | 25.46 |
| 26 | 27.369 | variable | | |
| 27 | 29.954 | 11.737 | 1.49700 | 81.61 |
| 28 | −29.954 | 0.799 | | |
| 29* | −95.537 | 1.838 | 1.80610 | 40.73 |
| 30* | −1312.991 | 19.850 | | |
| image | infinity | | | |

Aspheric data

| # | K | A4 | A6 | A8 | A10 | A12 | A14 | A16 |
|---|---|---|---|---|---|---|---|---|
| 5 | 0.0000e+000 | 1.2336e−005 | −5.7597e−008 | 1.6342e−010 | −2.8199e−013 | 1.9851e−016 | 0.0000e+000 | 0.0000e+000 |
| 6 | 0.0000e+000 | 6.5003e−006 | −7.1854e−008 | 2.0376e−010 | −4.2318e−013 | 3.5547e−016 | 0.0000e+000 | 0.0000e+000 |
| 13 | 0.0000e+000 | −3.0260e−006 | −1.4432e−009 | 3.0013e−012 | −4.6809e−015 | 0.0000e+000 | 0.0000e+000 | 0.0000e+000 |
| 14 | 0.0000e+000 | 3.4280e−006 | 5.5269e−010 | 3.3978e−012 | 0.0000e+000 | 0.0000e+000 | 0.0000e+000 | 0.0000e+000 |
| 29 | 0.0000e+000 | −4.5744e−005 | 8.0650e−008 | 8.5860e−011 | −7.2196e−013 | 0.0000e+000 | 0.0000e+000 | 0.0000e+000 |
| 30 | 0.0000e+000 | −3.6175e−005 | 1.0279e−007 | −1.1269e−011 | −4.3564e−013 | 0.0000e+000 | 0.0000e+000 | 0.0000e+000 |

Various types of data
zoom ratio 2.35

| | Wide | Middle | Tele |
|---|---|---|---|
| Fl | 13.523 | 20.743 | 31.838 |
| Fno. | 2.200 | 2.200 | 2.200 |
| ω | 46.400 | 34.394 | 24.037 |
| y'max | 14.200 | 14.200 | 14.200 |
| TL | 195.068 | 192.145 | 208.955 |
| BF | 19.850 | 19.850 | 19.850 |
| d2 | 0.788 | 14.776 | 33.139 |
| d9 | 30.086 | 12.294 | 2.144 |
| d12 | 15.901 | 7.360 | 2.012 |
| d23 | 3.282 | 11.534 | 20.825 |
| d26 | 4.062 | 5.231 | 9.886 |

Lens-group data

| Group (faces) | Fl |
|---|---|
| 1 (1-2) | 268.674 |
| 2 (3-9) | −21.592 |
| 3 (10-12) | 175.162 |
| 4 (13-23) | 40.197 |
| 5 (24-26) | −42.340 |
| 6 (27-30) | 40.985 |

Numerical Example 8

Unit: mm

| # | r | d | nd | vd |
|---|---|---|---|---|
| object | infinity | infinity | | |
| 1 | 100.067 | 6.789 | 1.62041 | 60.34 |
| 2 | 215.454 | variable | | |

-continued

| | | | | |
|---|---|---|---|---|
| 3 | 116.796 | 3.020 | 1.83400 | 37.16 |
| 4 | 25.496 | 11.616 | | |
| 5* | 131.299 | 2.626 | 1.58270 | 59.34 |
| 6* | 31.107 | 9.581 | | |
| 7 | −53.650 | 1.983 | 1.49700 | 81.61 |
| 8 | 61.216 | 5.271 | 2.00100 | 29.13 |
| 9 | −1312.991 | variable | | |
| 10 | 68.173 | 1.733 | 1.59349 | 67.00 |
| 11 | 35.550 | 4.652 | 1.69895 | 30.05 |
| 12 | 90.896 | variable | | |
| 13* | 99.408 | 4.315 | 1.58313 | 59.46 |
| 14* | −157.038 | 3.527 | | |
| 15 (stop) | infinity | 5.649 | | |
| 16 | −67.509 | 1.969 | 1.74950 | 35.33 |
| 17 | 73.063 | 9.835 | 1.59282 | 68.62 |
| 18 | −58.784 | 0.197 | | |
| 19 | 79.687 | 11.480 | 1.49700 | 81.61 |
| 20 | −50.625 | 0.197 | | |
| 21 | 53.062 | 2.101 | 1.80610 | 33.27 |
| 22 | 23.587 | 13.086 | 1.59282 | 68.62 |
| 23 | −315.551 | variable | | |
| 24 | 313.378 | 1.260 | 1.76200 | 40.10 |
| 25 | 17.269 | 3.691 | 1.84666 | 23.78 |
| 26 | 24.841 | variable | | |
| 27 | 32.472 | 11.544 | 1.49700 | 81.61 |
| 28 | −28.818 | 0.780 | | |
| 29* | −96.742 | 2.232 | 1.80610 | 40.73 |
| 30* | −1312.991 | 19.850 | | |
| image | infinity | | | |

Aspheric data

| # | K | A4 | A6 | A8 | A10 | A12 | A14 | A16 |
|---|---|---|---|---|---|---|---|---|
| 5 | 0.0000e+000 | 3.0531e−006 | −1.3636e−008 | 3.7746e−011 | −8.0488e−014 | 6.1887e−017 | 0.0000e+000 | 0.0000e+000 |
| 6 | 0.0000e+000 | −4.0945e−006 | −2.2350e−008 | 4.9643e−011 | −1.4492e−013 | 1.3596e−016 | 0.0000e+000 | 0.0000e+000 |
| 13 | 0.0000e+000 | −2.6484e−006 | −9.5220e−010 | 1.1041e−013 | 4.9600e−015 | 0.0000e+000 | 0.0000e+000 | 0.0000e+000 |
| 14 | 0.0000e+000 | 3.9315e−006 | 3.3168e−011 | 6.2671e−012 | 0.0000e+000 | 0.0000e+000 | 0.0000e+000 | 0.0000e+000 |
| 29 | 0.0000e+000 | −4.5997e−005 | 3.3884e−008 | 2.7172e−010 | −9.2364e−013 | 0.0000e+000 | 0.0000e+000 | 0.0000e+000 |
| 30 | 0.0000e+000 | −3.7755e−005 | 6.3789e−008 | 1.2351e−010 | −5.4968e−013 | 0.0000e+000 | 0.0000e+000 | 0.0000e+000 |

Various types of data
zoom ratio 2.35

| | Wide | Middle | Tele |
|---|---|---|---|
| Fl | 13.523 | 20.745 | 31.840 |
| Fno. | 2.200 | 2.200 | 2.200 |
| ω | 46.399 | 34.392 | 24.036 |
| y'max | 14.200 | 14.200 | 14.200 |
| TL | 195.069 | 190.742 | 206.296 |
| BF | 19.850 | 19.850 | 19.850 |
| d2 | 0.788 | 15.133 | 35.569 |
| d9 | 30.779 | 11.625 | 1.407 |
| d12 | 17.101 | 8.943 | 2.480 |
| d23 | 3.282 | 10.208 | 18.177 |
| d26 | 4.135 | 5.848 | 9.679 |

Lens-group data

| Group (faces) | Fl |
|---|---|
| 1 (1-2) | 294.532 |
| 2 (3-9) | −22.853 |
| 3 (10-12) | 234.064 |
| 4 (13-23) | 37.190 |
| 5 (24-26) | −38.169 |
| 6 (27-30) | 41.886 |

Table 1 indicates numerical values for each Example. Table 2 indicates conditional-expression corresponding values for each Example. In Table 2, Expression (3)-1, Expression (3)-2, Expression (3)-3, and Expression (3)-4 indicate, in order from the object side, the Abbe's numbers of the corresponding positive lenses.

TABLE 1

Example numerical values

| | ft | fl | nd2p | nd2n | f4 | f5 | f6 |
|---|---|---|---|---|---|---|---|
| Example 1 | 31.839 | 217.325 | 2.001 | 1.497 | 35.956 | −42.820 | 41.859 |
| Example 2 | 31.838 | 260.041 | 2.001 | 1.497 | 39.379 | −40.767 | 40.882 |

TABLE 1-continued

Example numerical values

|  | ft | fl | nd2p | nd2n | f4 | f5 | f6 |
|---|---|---|---|---|---|---|---|
| Example 3 | 31.840 | 312.954 | 2.001 | 1.497 | 38.805 | −43.358 | 42.928 |
| Example 4 | 31.840 | 268.386 | 2.001 | 1.497 | 38.931 | −44.535 | 43.339 |
| Example 5 | 31.840 | 263.856 | 2.001 | 1.497 | 39.376 | −43.550 | 41.959 |
| Example 6 | 31.841 | 297.542 | 2.001 | 1.497 | 39.069 | −45.523 | 44.927 |
| Example 7 | 31.838 | 268.674 | 2.001 | 1.497 | 40.197 | −42.340 | 40.985 |
| Example 8 | 31.840 | 294.532 | 2.001 | 1.497 | 37.190 | −38.169 | 41.886 |

TABLE 2

Example conditional expressions

|  | Expression (1) | Expression (2) | Expression (3)-1 | Expression (3)-2 | Expression (3)-3 | Expression (3)-4 | Expression (4) | Expression (5) |
|---|---|---|---|---|---|---|---|---|
| Example 1 | 0.147 | 0.504 | 68.62 | 81.61 | 68.62 | 81.61 | 1.129 | −1.023 |
| Example 2 | 0.122 | 0.504 | 70.44 | 81.61 | 68.62 | 81.61 | 1.237 | −0.997 |
| Example 3 | 0.102 | 0.504 | 68.62 | 81.61 | 68.62 | 81.61 | 1.219 | −1.010 |
| Example 4 | 0.119 | 0.504 | 68.62 | 81.61 | 68.62 | 81.61 | 1.223 | −1.028 |
| Example 5 | 0.121 | 0.504 | 68.62 | 81.61 | 68.62 | 81.61 | 1.237 | −1.038 |
| Example 6 | 0.107 | 0.504 | 68.62 | 81.61 | 68.62 | 81.61 | 1.227 | −1.013 |
| Example 7 | 0.119 | 0.504 | 70.44 | 81.61 | 68.62 | 81.61 | 1.263 | −1.033 |
| Example 8 | 0.108 | 0.504 | 68.62 | 81.61 | 68.62 | 81.61 | 1.168 | −0.911 |

*Expressions (3) indicate, in order from object side, Abbe's numbers of corresponding lenses.

Figure 17:
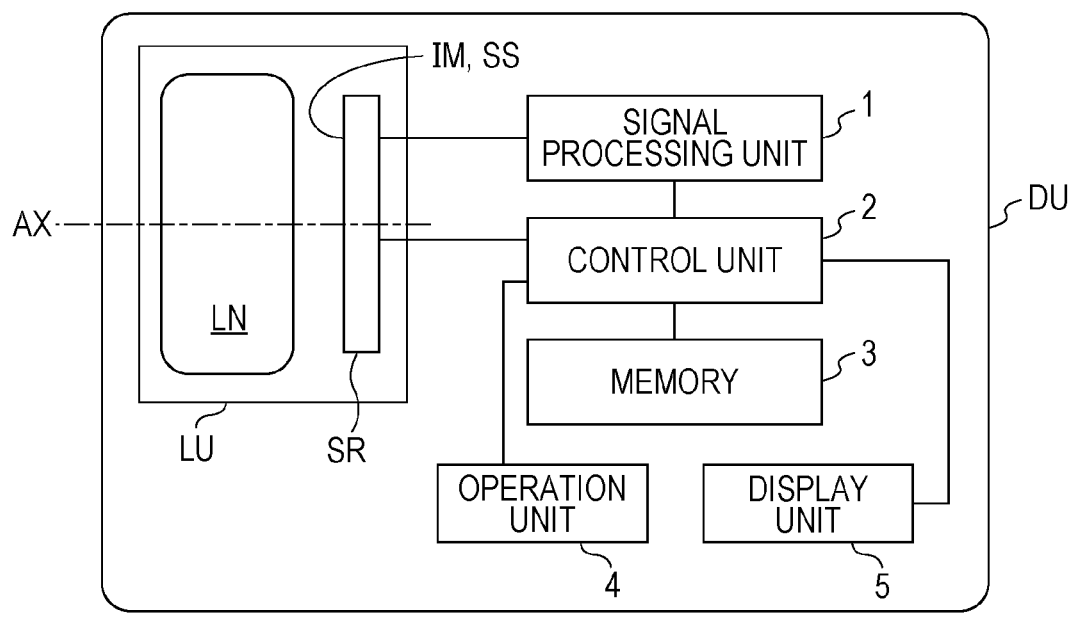
FIG. 17 is a schematic diagram of configurations of an image pickup optical device including a zoom lens and a digital apparatus according to the present embodiment.

FIG. 17 is a schematic diagram of configurations of an image pickup optical device including a zoom lens and a digital apparatus according to the present embodiment. As illustrated in FIG. 17, the digital apparatus DU includes the image pickup optical device LU. The image pickup optical device LU includes, in order from the object side (namely, subject side), the zoom lens LN that forms an optical image of an object (image plane IM) (AX represents the optical axis) and an image pickup element SR that converts the optical image formed on a light receiving face (image pickup face) SS by the zoom lens LN, into an electric signal. As necessary, a parallel flat plate may be arranged in the image pickup optical device LU (e.g., a cover glass for the image pickup element SR or an optical filter, such as an optical low-pass filter or an infrared cut-off filter, to be arranged as necessary).

As the image pickup element SR, for example, provided is a solid-state image pickup element, such as a charge coupled device (CCD) type image sensor or a complementary metal-oxide semiconductor (CMOS) type image sensor, having a plurality of pixels. The zoom lens LN is provided so as to form an optical image of a subject onto the light-receiving face SS that is the photoelectric converter of the image pickup element SR. The optical image formed by the zoom lens LN is converted into an electric signal by the image pickup element SR.

The digital apparatus DU includes a signal processing unit 1, a control unit 2, a memory 3, an operation unit 4, and a display unit 5, in addition to the image pickup optical device LU. The signal processing unit 1 performs, as necessary, predetermined processing, such as digital image processing or image compression processing, to the signal generated by the image pickup element SR, to generate a digital video signal. The digital video signal is recorded onto the memory 3 (e.g., a semiconductor memory or an optical disc). The digital video signal may be transmitted to another apparatus.

The control unit 2 including a microcomputer, controls a function, such as a capturing function (e.g., a still-image capturing function or a moving-image capturing function) or an image reproduction function, or controls a lens movement mechanism for focusing or the like, intensively. For example, the control unit 2 controls the image pickup optical device LU such that at least either still-image capturing of the subject or moving-image capturing of the subject is performed.

The display unit 5 including a display, such as a liquid crystal monitor, performs image display with the image signal converted by the image pickup element SR or the image information recorded on the memory 3.

The operation unit 4 including operation members, such as an operation button (e.g., a release button) and an operation dial (e.g., a capturing mode dial), sends information operation-input by an operator, to the control unit 2.

According to an embodiment of the present disclosure, provided can be a zoom lens corrected favorably in aberration, having a wide angle of view at the wide end thereof and f-number small over the entire range of zooming, an image pickup optical device including the zoom lens, and a digital apparatus.

Although embodiments of the present invention have been described and illustrated in detail, the disclosed embodiments are made for purposes of illustration and example only and not limitation. The scope of the present invention should be interpreted by terms of the appended claims, and intends to include all alternations in the meaning and scope of equivalents of the scope of the claims.

What is claimed is:

1. A zoom lens comprising, in order from an object side:
a first lens group having positive refractive power;
a second lens group having negative refractive power;
a third lens group;
a fourth lens group having positive refractive power;
a fifth lens group having negative refractive power; and
a sixth lens group having positive refractive power,
wherein, during zooming, an interval between adjacent two lens groups varies among the first lens group, the second lens group, the third lens group, the fourth lens group, the fifth lens group, and the sixth lens group,
the sixth lens group includes at least one negative lens, and
the following Conditional Expression (1) is satisfied:

$$0 < ft/fl \leq 0.42 \qquad (1)$$

where ft represents a focal length of an entire system at a tele end, and
fl represents a focal length of the first lens group.

2. The zoom lens according to claim 1, wherein
the second lens group includes at least one cemented lens satisfying the following Conditional Expression (2):

$$nd2p - nd2n \geq 0.1 \qquad (2)$$

where nd2p represents a refractive index for a d line of a positive lens in the cemented lens in the second lens group, and nd2n represents a refractive index for the d line of a negative lens in the cemented lens in the second lens group.

3. The zoom lens according to claim 1, wherein the lens groups on an image side from the fourth lens group include at least three positive lenses satisfying the following Conditional Expression (3):

$$vdp \geq 60 \qquad (3)$$

where vdp represents an Abbe's number of each positive lens arranged on the image side from the fourth lens group.

4. The zoom lens according to claim 1, wherein the fourth lens group satisfies the following Conditional Expression (4):

$$0.6 \leq f4/ft \leq 1.6 \qquad (4)$$

where f4 represents a focal length of the fourth lens group.

5. The zoom lens according to claim 1, wherein the fifth lens group moves on an optical axis in focusing from a far-distance object to a near-distance object, and the following Conditional Expression (5) is satisfied:

$$-2.0 \leq f5/f6 \leq -0.5 \qquad (5)$$

where f5 represents a focal length of the fifth lens group, and f6 represents a focal length of the sixth lens group.

6. The zoom lens according to claim 1, wherein the first lens group includes one positive lens.

7. An image pickup optical device comprising:
the zoom lens according to claim 1; and
an image pickup element that converts an optical image of a subject formed on a light-receiving face of the image pickup element into an electric signal,
wherein the zoom lens is provided such that the optical image is formed on the light-receiving face of the image pickup element.

8. A digital apparatus comprising:
the image pickup optical device according to claim 7,
wherein the digital apparatus has at least one of a function of capturing a still image of a subject and a function of capturing a moving-image of the subject.

\* \* \* \* \*